(12) United States Patent
Yoshimi

(10) Patent No.: US 10,427,487 B2
(45) Date of Patent: Oct. 1, 2019

(54) SUSPENSION DEVICE FOR VEHICLE

(71) Applicant: TOYOTA JIDOSHA KABUSHIKI KAISHA, Toyota-shi, Aichi-ken (JP)

(72) Inventor: Tsuyoshi Yoshimi, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 35 days.

(21) Appl. No.: 15/292,279

(22) Filed: Oct. 13, 2016

(65) Prior Publication Data

US 2017/0120710 A1    May 4, 2017

(30) Foreign Application Priority Data

Oct. 28, 2015   (JP) .................................. 2015-211676

(51) Int. Cl.
| | | |
|---|---|---|
| *B60G 17/018* | (2006.01) | |
| *B60G 17/015* | (2006.01) | |
| *B60G 17/0165* | (2006.01) | |
| *B60G 21/10* | (2006.01) | |

(52) U.S. Cl.
CPC ....... *B60G 17/018* (2013.01); *B60G 17/0152* (2013.01); *B60G 17/0165* (2013.01); *B60G 21/103* (2013.01); *B60G 2202/25* (2013.01); *B60G 2204/41062* (2013.01); *B60G 2204/81* (2013.01); *B60G 2400/204* (2013.01); *B60G 2400/258* (2013.01); *B60G 2400/91* (2013.01); *B60G 2800/162* (2013.01)

(58) Field of Classification Search
None
See application file for complete search history.

(56) References Cited

U.S. PATENT DOCUMENTS

| | | | | |
|---|---|---|---|---|
| 5,609,353 A | * | 3/1997 | Watson ................ | B60G 17/015 188/267 |
| 2005/0049761 A1 | * | 3/2005 | Kataoka ............... | B60G 17/016 701/1 |

(Continued)

FOREIGN PATENT DOCUMENTS

| | | |
|---|---|---|
| JP | 07-088129 B2 | 9/1995 |
| JP | 2009-040349 A | 2/2009 |

(Continued)

OTHER PUBLICATIONS

Schauffele et al., "Automotive Software Engineering—Principles, Processes, Methods, and Tools", 2009, SAE International, p. 2-11 (Year: 2009).*

*Primary Examiner* — Tamara L Weber
(74) *Attorney, Agent, or Firm* — Sughrue Mion, PLLC

(57) ABSTRACT

A characteristic is set to a first transmission force characteristic. A sensitivity is set to a first sensitivity. The maximum value of the square of a product of a value representing the first transmission force characteristic and a value representing the first sensitivity in a predetermined frequency range preset so as to include a frequency at which the value representing the first transmission force characteristic takes a peak value is set to an evaluation indication value. A complex spring constant in the vehicle longitudinal direction of the rear wheel suspension is set so that the evaluation indication value takes the minimum value out of values in a variable range of the evaluation indication value.

8 Claims, 8 Drawing Sheets

(56) References Cited

U.S. PATENT DOCUMENTS

2005/0212356 A1* 9/2005 Huchard ............ B60G 17/0195
303/112
2009/0248247 A1* 10/2009 Furuichi .............. B60G 17/016
701/37

FOREIGN PATENT DOCUMENTS

| JP | 2009-078619 A | 4/2009 |
|----|---------------|--------|
| JP | 2009-227200 A | 10/2009 |

* cited by examiner

TRANSMISSION FORCE
CHARACTERISTIC
$F_1/F$ $f_s$

FREQUENCY f

SENSITIVITY
$Xs^2/F_1$ $f_{tv}$   $f_{tm}$

FREQUENCY f

SQUARE OF
FIRST PRODUCT
$[(F_1/F)(Xs^2/F_1)]^2$ $f_s$

FREQUENCY f

SQUARE OF
FIRST PRODUCT
$[(F_1/F)(Xs^2/F_1)]^2$ fl   $f_s$   fh

FREQUENCY f

SUSPENSION DEVICE FOR VEHICLE

CROSS-REFERENCE TO RELATED APPLICATIONS

The disclosure of Japanese Patent Application No. JP 2015-211676 filed on Oct. 28, 2015 is incorporated herein by reference in its entirety.

BACKGROUND

1. Technical Field

The present disclosure relates to a suspension device for a vehicle, e.g., a motor vehicle.

2. Description of the Related Art

In a vehicle, e.g., a motor vehicle, a plurality of wheels are respectively suspended by corresponding suspensions from a vehicle body. Each of the suspensions includes an elastically deformable member, e.g., a suspension spring, for allowing relative displacement between the wheel and the vehicle body, and a shock absorber for generating a damping force. When a force is input from a road surface to the wheel, this force is transmitted to the vehicle body via the suspension, resulting in excitation of the vehicle body. Thus, an effort is made to decrease the vibration of the vehicle body so as to increase ride comfort of the vehicle by devising a structure of the suspension so that the force input from the road surface to the wheel is prevented from being transmitted to the vehicle body as much as possible.

For example, in Japanese Patent Application Laid-open No. 2009-40349, there is disclosed a suspension configured so that a longitudinal force input from a road surface to a wheel when the wheel vertically strokes is canceled out by a sum of a component in a vehicle longitudinal direction of a force generated by elastic deformation of an elastically deformable member and a component in the vehicle longitudinal direction of a damping force.

In general, a primary function of the suspension is to allow displacement of the wheel in the vertical direction with respect to the vehicle body, and simultaneously attenuate the vibration of the wheel with respect to the vehicle body. Therefore, there is a limit to increasing the magnitude of the component in the vehicle longitudinal direction of the force generated by the elastic deformation of the elastically deformable member and the magnitude of the component in the vehicle longitudinal direction of the damping force without impairing the primary function of the suspension. Thus, there is a limit to decreasing the longitudinal vibration of the vehicle body by devising the structure of the suspension so that the force transmitted to the vehicle body via the suspension is decreased.

Moreover, it is conceivable to set a longitudinal compliance of the suspension to be high in order to decrease the longitudinal force transmitted to the vehicle body via the suspension. However, when the longitudinal compliance of the suspension is set to be high, operation stability of the vehicle decreases, and it is thus difficult to increase both ride comfort of the vehicle and the operation stability of the vehicle.

SUMMARY

The inventor of the present application diligently studied the above-mentioned problem, and found out that the longitudinal vibration of the vehicle body can effectively be decreased by effectively using a function of one of a front wheel and a rear wheel as a dynamic damper when the longitudinal force is input to the other one of the front wheel and the rear wheel. Further, the inventor of the present application focused on the above-mentioned function, and found out that the above-mentioned function can be effectively exerted by optimizing a characteristic in the longitudinal direction of the suspension for one of the front wheel and the rear wheel when the longitudinal force is input to the other one of the front wheel and the rear wheel.

On the basis of the above-mentioned finding, it is an object of the present disclosure to decrease the longitudinal vibration of the vehicle body without decreasing the operation stability of the vehicle by optimally setting the characteristic in the longitudinal direction of the suspension for the wheel separated in the vehicle longitudinal direction from the wheel to which the longitudinal force is input.

According to the present disclosure, there is provided a suspension device for a vehicle including first and second suspensions for respectively suspending, from the vehicle body, first and second wheels arranged separately from each other in the vehicle longitudinal direction.

According to one embodiment of the present disclosure, there is provided a suspension device for a vehicle, in which: a first product is set as a product $((Xs^2/F_1) \cdot (F_1/F))$ of a first transmission force characteristic $(Xs^2/F_1)$ (s is Laplacian) represented by a first transmission force $(F_1)$, which is a force received by the vehicle body from the first wheel, and a displacement (X) of the vehicle body in the longitudinal direction when a first longitudinal force (F) is input to the first wheel and a sensitivity $(F_1/F)$ of the vehicle, which is a ratio of the first transmission force $(F_1)$ to the first longitudinal force (F); a target complex spring constant is set as a complex spring constant in the vehicle longitudinal direction of the second suspension in a case where an evaluation indication value correlating with a square $(\{(Xs^2/F_1) \cdot (F_1/F)\}^2)$ of the first product takes a minimum value out of values that are likely to be taken by the evaluation indication value in a predetermined frequency range (fl to fh) set in advance so as to include a peak frequency $(f_s)$ corresponding to a peak value of the first transmission force characteristic; and the complex spring constant in the vehicle longitudinal direction of the second suspension is set to the target complex spring constant.

Both the value representing the first transmission force characteristic $(Xs^2/F_1)$ and the value representing the first sensitivity $(F_1/F)$ depend on the frequency, and thus take different values depending on the frequency of the first longitudinal force (F). In particular, the value representing the first transmission force characteristic $(Xs^2/F_1)$ takes the peak value when the frequency of the first longitudinal force (F) is at the specific frequency $(f_s)$.

According to one embodiment of the present disclosure, there is provided a suspension device for a vehicle, in which: a first product is set as a product $((Xs^2/F_1) \cdot (F_1/F))$ of a sensitivity $(Xs^2/F_1)$ (s is Laplacian) represented by a first transmission force $(F_1)$, which is a force received by the vehicle body from the first wheel, and a displacement (X) of the vehicle body in the longitudinal direction when a first longitudinal force (F) is input to the first wheel and a first transmission force characteristic $(F_1/F)$ of the vehicle, which is a ratio of the first transmission force $(F_1)$ to the first longitudinal force (F); a target complex spring constant is set as a complex spring constant in the vehicle longitudinal direction of the second suspension in a case where an evaluation indication value correlating with a square $(\{(Xs^2/F_1) \cdot (F_1/F)\}^2)$ of the first product takes a minimum value out of values that are likely to be taken by the evaluation indication value in a predetermined frequency range (fl to fh) set in advance so as to include a peak frequency ($f_s$) corresponding to a peak value of the first transmission force characteristic; and the complex spring constant in the vehicle longitudinal direction of the second suspension is set to the target complex spring constant.

As described in detailed later, it can be considered that a complex spring acting in the vehicle longitudinal direction exists in the second suspension. A coefficient of the complex spring representing a relationship between the longitudinal force acting on the second suspension and the displacement is a sum of the spring constant and the damping coefficient. The spring constant is a real number, and the damping coefficient is a complex number. Thus, the spring constant in the vehicle longitudinal direction of the second suspension is referred to as a complex spring constant.

Further, as detailed later, the first product $((Xs^2/F_1) \cdot (F_1/F))$ represents a transfer characteristic of the vehicle relating to the first longitudinal force input to the first wheel, i.e., a ratio of a longitudinal acceleration of the vehicle body to the first longitudinal force. In other words, the first product represents a ratio of a vehicle body excitation force caused by the first longitudinal force to the first longitudinal force. Thus, with the above-mentioned configuration, the ratio of the vehicle body excitation force to the longitudinal force input to the first wheel can be decreased by setting at least the complex spring constant in the vehicle longitudinal direction of the suspension for the second wheel without increasing the longitudinal compliance of the suspension for the first wheel to which the longitudinal force is input. Thus, the longitudinal vibration of the vehicle body caused by the longitudinal force input to the first wheel can be decreased, thereby increasing ride comfort of the vehicle without decreasing operation stability of the vehicle caused by the increase in the longitudinal compliance of the first wheel.

In one aspect of the present disclosure, the evaluation indication value is a maximum value of the square $(\{(Xs^2/F_1) \cdot (F_1/F)\}^2)$ of the first product in the predetermined frequency range (fl to fh).

As described above, the first product $((Xs^2/F_1) \cdot (F_1/F))$ represents the ratio of the vehicle body excitation force caused by the first longitudinal force to the first longitudinal force. Thus, according to the above-mentioned aspect, the evaluation indication value is the square of the ratio of the vehicle body excitation force caused by the first longitudinal force to the first longitudinal force. Therefore, the evaluation indication value can be used to determine the magnitude of the ratio of the vehicle body excitation force to the first longitudinal force in the predetermined frequency range (fl to fh).

In another aspect of the present disclosure, the evaluation indication value is a maximum value of a product $(G\{(Xs^2/F_1) \cdot (F_1/F)\}^2)$ of a first coefficient (G) set depending on a frequency of the first longitudinal force (F) so as to increase as a passenger of the vehicle is more likely to feel a longitudinal vibration of the vehicle body caused by the first longitudinal force (F) and the square $(\{(Xs^2/F_1) \cdot (F_1/F)\}^2)$ of the first product in the predetermined frequency range (fl to fh).

How likely the passenger of the vehicle is to feel the longitudinal vibration of the vehicle body caused by the first longitudinal force varies depending on the frequency of the first longitudinal force. According to the above-mentioned aspect, the evaluation indication value is the maximum value of the product of the first coefficient (G) and the square $(\{(Xs^2/F_1) \cdot (F_1/F)\}^2)$ of the first product. The first coefficient is a value set depending on the frequency of the first longitudinal force so as to increase as the passenger of the vehicle is more likely to feel the longitudinal vibration of the vehicle body caused by the first longitudinal force.

Thus, the evaluation indication value for determining the magnitude of the ratio of the vehicle body excitation force to the first longitudinal force in the predetermined frequency range can be increased as the passenger of the vehicle is more likely to feel the longitudinal vibration of the vehicle body caused by the first longitudinal force. Further, the target complex spring constant is set as the complex spring constant in the vehicle longitudinal direction of the second suspension when the evaluation indication value takes the minimum value out of the values that are likely to be taken in the predetermined frequency range (fl to fh), and the complex spring constant in the vehicle longitudinal direction of the second suspension is set to the target complex spring constant.

Thus, the complex spring constant in the vehicle longitudinal direction of the suspension for the second wheel can be set so that the ratio of the vehicle body excitation force to the longitudinal force input to the first wheel decreases, taking into consideration how likely the passenger of the vehicle is to feel the longitudinal vibration of the vehicle body caused by the first longitudinal force in the predetermined frequency range. Thus, compared with a case where how likely the passenger of the vehicle is to feel the longitudinal vibration of the vehicle body is not considered, the longitudinal vibration of the vehicle body in the frequency range in which the passenger is likely to feel the longitudinal vibration of the vehicle body caused by the first longitudinal force can be decreased.

Further, in another aspect of the present disclosure, the evaluation indication value is a value acquired by integrating the square $(\{(Xs^2/F_1) \cdot (F_1/F)\}^2)$ of the first product from a lower limit value (fl) to an upper limit value (fh) in the predetermined frequency range (fl to fh).

According to the above-mentioned aspect, the evaluation indication value is a value acquired by accumulating the value of the ratio of the vehicle body excitation force caused by the first longitudinal force to the first longitudinal force from the lower limit value to the upper limit value of the predetermined frequency range. Thus, the ratio of the vehicle body excitation force to the longitudinal force input to the first wheel can be decreased in the entire frequency range of from the lower limit value to the upper limit value.

Further, in another aspect of the present disclosure, the first and second wheels are respectively a front wheel and a rear wheel. A second product is set as a product $((X_R s^2/F_{1R}) \cdot (F_{1R}/F_R))$ of a second transmission force characteristic $(X_R s^2/F_{1R})$ (s is Laplacian) represented by a second transmission force ($F_{1R}$), which is a force received by the vehicle body from the second wheel, and a displacement ($X_R$) of the vehicle body in the longitudinal direction when a second longitudinal force ($F_R$) is input to the second wheel and a second sensitivity ($F_{1R}/F_R$) of the vehicle, which is a ratio of the second transmission force ($F_{1R}$) to the second longitudinal force ($F_R$), is set to a second product. Further, the evaluation indication value is a maximum value of a sum of the square $(\{(X_F s^2/F_{1F}) \cdot (F_{1F}/F_F)\}^2)$ of the first product and a square $(\{(X_R s^2/F_{1R}) \cdot (F_{1R}/F_R)\}^2)$ of the second product in the predetermined frequency range (fl to fh).

The second product $((X_R s^2/F_{1R}) \cdot (F_{1R}/F_R))$ is the ratio of the vehicle body excitation force caused by the second longitudinal force to the second longitudinal force, and, according to the above-mentioned aspect, the evaluation indication value is the maximum value of the sum of the square of the first product and the square of the second product. Thus, the evaluation indication value can be used to decrease the sum of the magnitude of the ratio of the vehicle body excitation force caused by the first longitudinal force to the first longitudinal force and the magnitude of the ratio of the vehicle body excitation force caused by the second longitudinal force to the second longitudinal force. Thus, the longitudinal vibration of the vehicle body can be decreased in the state where the longitudinal forces are input to the front wheel and the rear wheel.

Further, in another aspect of the present disclosure, a first coefficient (G1) is set as a coefficient that is set depending on a frequency of the first longitudinal force ($F_F$) so as to increase as a passenger of the vehicle is more likely to feel a longitudinal vibration of the vehicle body caused by the first longitudinal force ($F_F$). A second coefficient (G2) is set as a coefficient that is set depending on a frequency of the second longitudinal force ($F_R$) so as to increase as the passenger of the vehicle is more likely to feel a longitudinal vibration of the vehicle body caused by the second longitudinal force ($F_R$). Further, the evaluation indication value is a maximum value of a sum of a product ($G1\{(X_Fs^2/F_{1F}) \cdot (F_{1F}/F_F)\}^2$) of the first coefficient (G1) and the square ($\{(X_Fs^2/F_{1F}) \cdot (F_{1F}/F_F)\}^2$) of the first product and a product ($G2\{(X_Rs^2/F_{1R}) \cdot (F_{1R}/F_R)\}^2$) of the second coefficient (G2) and the square ($\{(X_Rs^2/F_{1R}) \cdot (F_{1R}/F_R)\}^2$) of the second product.

As described above, how likely the passenger of the vehicle is to feel the longitudinal vibration of the vehicle body caused by the first longitudinal force ($F_F$) varies depending on the frequency of the first longitudinal force. Similarly, how likely the passenger of the vehicle is to feel the longitudinal vibration of the vehicle body caused by the second longitudinal force ($F_R$) varies depending on the frequency of the second longitudinal force.

According to the above-mentioned aspect, the evaluation indication value is the maximum value of the sum of the product ($G1\{(X_Fs^2/F_{1F}) \cdot (F_{1F}/F_F)\}^2$) of the first coefficient and the square of the first product and the product ($G2\{(X_Rs^2/F_{1R}) \cdot (F_{1R}/F_R)\}^2$) of the second coefficient and the square of the second product. The first coefficient (G1) is the value set depending on the frequency of the first longitudinal force so as to increase as the passenger of the vehicle is more likely to feel the longitudinal vibration of the vehicle body caused by the first longitudinal force ($F_F$). Thus, the product of the first coefficient, which is the indication value of the magnitude of the ratio of the vehicle body excitation force caused by the first longitudinal force to the first longitudinal force, and the square of the first product can be increased as the passenger of the vehicle is more likely to feel the longitudinal vibration of the vehicle body caused by the first longitudinal force.

Similarly, the second coefficient (G2) is the value set depending on the frequency of the second longitudinal force so as to increase as the passenger of the vehicle is more likely to feel the longitudinal vibration of the vehicle body caused by the second longitudinal force ($F_R$). Thus, the product of the second coefficient, which is the indication value of the magnitude of the ratio of the vehicle body excitation force caused by the second longitudinal force to the second longitudinal force, and the square of the second product can be increased as the passenger of the vehicle is more likely to feel the longitudinal vibration of the vehicle body caused by the second longitudinal force.

Thus, at least the complex spring constant in the vehicle longitudinal direction of the suspension for the second wheel can be set so that the ratio of the vehicle body excitation force to the longitudinal force decreases, taking into consideration how likely the passenger of the vehicle is to feel the longitudinal vibration of the vehicle body caused by the first and second longitudinal forces in the predetermined frequency range (fl to fh). Thus, compared with the case where how likely the passenger of the vehicle is to feel the longitudinal vibration of the vehicle body is not considered, the longitudinal vibration of the vehicle body in the frequency range in which the passenger is likely to feel the longitudinal vibration of the vehicle body caused by the first and second longitudinal forces can be decreased.

Further, in another aspect of the present disclosure, the first and second wheels are respectively a front wheel and a rear wheel. A second product is set as a product (($X_Rs^2/F_{1R}) \cdot (F_{1R}/F_R)$) of a second transmission force characteristic ($X_Rs^2/F_{1R}$) (s is Laplacian) represented by a second transmission force ($F_{1R}$), which is a force received by the vehicle body from the second wheel, and a displacement ($X_R$) of the vehicle body in the longitudinal direction when a second longitudinal force ($F_R$) is input to the second wheel and the second sensitivity ($F_{1R}/F_R$) of the vehicle, which is a ratio of the second transmission force ($F_{1R}$) to the second longitudinal force ($F_R$). Further, the evaluation indication value is a value acquired by integrating a sum of the square ($\{(X_Fs^2/F_{1F}) \cdot (F_{1F}/F_F)\}^2$) of the first product and a square ($\{(X_Rs^2/F_{1R}) \cdot (F_{1R}/F_R)\}^2$) of the second product from a lower limit value (fl) to an upper limit value (fh) of the predetermined frequency range (fl to fh).

The first product (($X_Fs^2/F_{1F}) \cdot (F_{1F}/F_F)$) is the ratio of the vehicle body excitation force caused by the first longitudinal force to the first longitudinal force. The second product (($X_Rs^2/F_{1R}) \cdot (F_{1R}/F_R)$) is the ratio of the vehicle body excitation force caused by the second longitudinal force to the second longitudinal force. According to the above-mentioned aspect, the evaluation indication value is the value acquired by accumulating the sum of the square of the ratio of the vehicle body excitation force caused by the first longitudinal force to the first longitudinal force and the square of the ratio of the vehicle body excitation force caused by the second longitudinal force to the second longitudinal force from the lower limit value (fl) to the upper limit value (fh) of the predetermined frequency range (fl to fh). Thus, the sum of the ratio of the vehicle body excitation force to the longitudinal force input to the first wheel and the ratio of the vehicle body excitation force to the longitudinal force input to the second wheel can be decreased in the entire frequency range of from the lower limit value to the upper limit value. Thus, the longitudinal vibration of the vehicle body can be decreased in the state where the first longitudinal force is input to the first wheel, and the second longitudinal force is input to the second wheel.

Further, in another aspect of the present disclosure, the second suspension includes an elastic body for allowing mutual displacement at least in the vehicle longitudinal direction between the second wheel and the vehicle body and a spring characteristic variable device for changing an apparent spring constant of the elastic body, thereby changing a compliance in the vehicle longitudinal direction of the second suspension. The spring characteristic variable device is configured to change the apparent spring constant of the elastic body, thereby variably setting a complex spring constant in the vehicle longitudinal direction of the second suspension.

According to the above-mentioned aspect, the second suspension includes the elastic body for allowing mutual displacement at least in the vehicle longitudinal direction between the second wheel and the vehicle body and the spring characteristic variable device for changing the apparent spring constant of the elastic body, thereby changing the compliance in the vehicle longitudinal direction of the second suspension. Thus, the compliance in the vehicle longitudinal direction of the second suspension can be changed by the spring characteristic variable device, and the complex spring constant in the vehicle longitudinal direction of the second suspension can thus be variably set to an optimal value, for example, depending on the vehicle speed and a load amount.

Further, according to one preferred aspect, the second suspension includes an elastic body for allowing mutual displacement at least in the vehicle longitudinal direction between the second wheel and the vehicle body, and the complex spring constant in the vehicle longitudinal direction of the second suspension is set by adjusting a spring characteristic in the vehicle longitudinal direction of the elastic body.

According to the above-mentioned aspect, the complex spring constant in the vehicle longitudinal direction of the second suspension can be set by adjusting the spring characteristic in the vehicle longitudinal direction of the elastic body for allowing the mutual displacement at least in the vehicle longitudinal direction between the second wheel and the vehicle body.

Further, according to another preferred aspect, the second suspension includes a shock absorber for damping a vertical oscillation of the second wheel with respect to the vehicle body, and the complex spring constant in the vehicle longitudinal direction of the second suspension is set by adjusting an inclination angle in the vehicle longitudinal direction of the shock absorber.

According to the above-mentioned aspect, the complex spring constant in the vehicle longitudinal direction of the second suspension is set by adjusting the inclination angle in the vehicle longitudinal direction of the shock absorber for damping the vertical oscillation of the second wheel with respect to the vehicle body.

According to still another preferred aspect, the second suspension includes the elastic body for allowing the mutual displacement at least in the vehicle longitudinal direction between the second wheel and the vehicle body and a spring characteristic variable device for changing a spring characteristic in the vehicle longitudinal direction of the elastic body. The spring characteristic variable device is configured to change the spring characteristic in the vehicle longitudinal direction of the elastic body depending on at least one variable out of the vehicle speed and a vehicle weight, thereby variably setting the complex spring constant in the vehicle longitudinal direction of the second suspension.

According to the above-mentioned aspect, the spring characteristic in the vehicle longitudinal direction of the elastic body can be changed depending on at least one of the vehicle speed and the vehicle weight. Thus, the complex spring constant in the vehicle longitudinal direction of the second suspension can be variably set depending on at least one of the vehicle speed and the vehicle weight.

DETAILED DESCRIPTION

[Principle of Present Invention Adopted in Embodiments]

Figure 13:
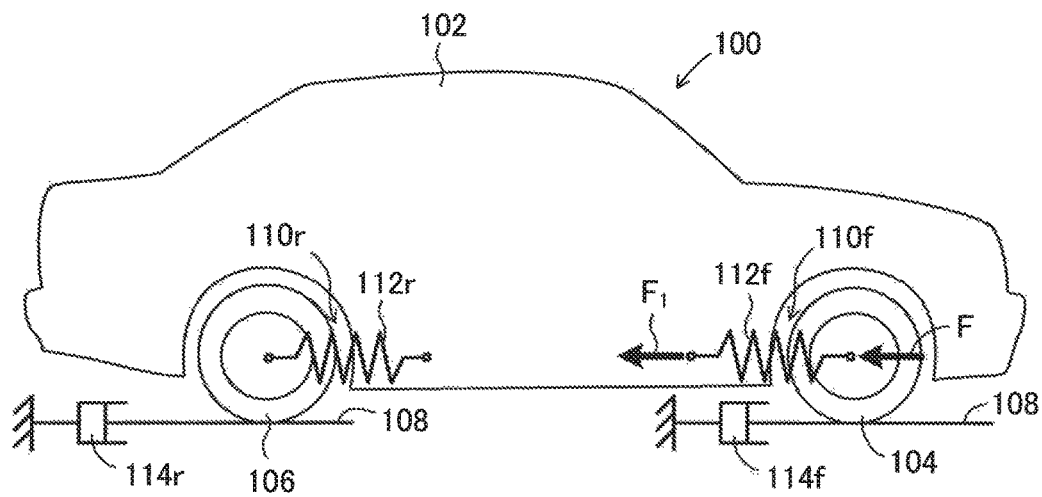
FIG. 13 is a side view for illustrating a model of the vehicle.
Figure 14:
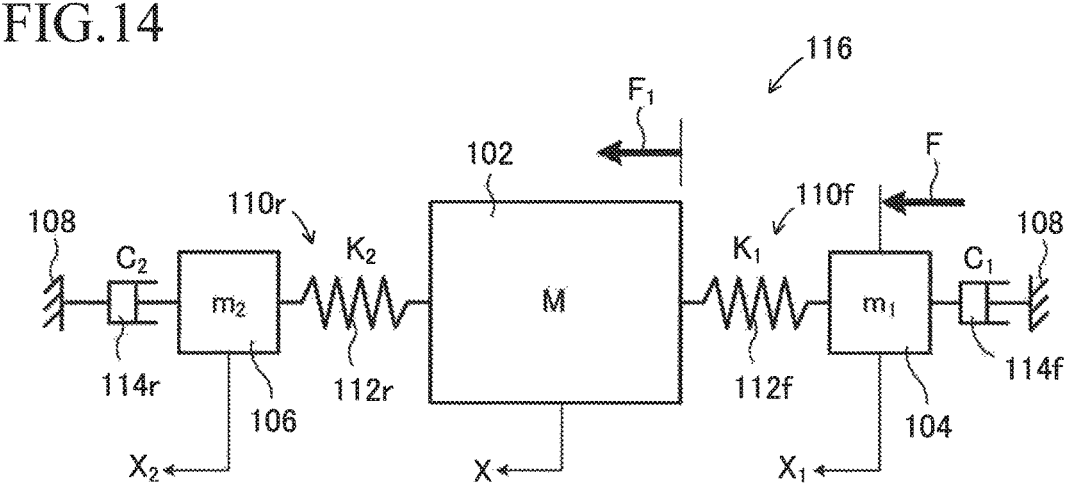
FIG. 14 is a diagram for illustrating a simplified model of the vehicle relating to transmission of forces in the vehicle longitudinal direction.

Referring to FIG. 13 and FIG. 14, a description is given of a principle of decreasing a longitudinal vibration of a vehicle body according to the present disclosure in order to facilitate understanding of the present disclosure before description of embodiments. FIG. 13 is a side view for illustrating a model of a vehicle. FIG. 14 is a diagram for illustrating a simplified model of the vehicle relating to transmission of a force in a vehicle longitudinal direction.

As illustrated in FIG. 13 and FIG. 14, a vehicle 100 includes wheels 104 and 106 suspended from a vehicle body (sprung portion) 102. The wheel 104 is a wheel (referred as "input wheel") on which an input causing a longitudinal vibration of the vehicle body 102 acts. The wheel 106 is a wheel (referred to as "non-input wheel") positioned backward or forward of the input wheel.

An input in the longitudinal direction received by the input wheel 104 from a road surface 108 is denoted by F. A transmission force received by the vehicle body 102 from the input wheel 104 is denoted by $F_1$. A displacement of the vehicle body 102 in the longitudinal direction caused by the transmission force $F_1$ is denoted by X. A transfer characteristic of the vehicle 100 relating to the longitudinal force is a ratio of an excitation force of the vehicle body 102 caused by the input F in the longitudinal direction to the input F in the longitudinal direction. The excitation force of the vehicle body 102 is proportional to an acceleration $Xs^2$ of the vehicle body where s is the Laplacian, and is represented as $Xs^2/F$. As represented by Expression (1), the transfer characteristic $Xs^2/F$ can be considered as a product of the sensitivity $Xs^2/F_1$ of the vehicle 100 to the longitudinal force, and the transmission force characteristic $F_1/F$ of the longitudinal force from the input wheel 104 to the vehicle body 102.

$$Xs^2/F = (Xs^2/F_1)(F_1/F) \qquad (1)$$

As illustrated in FIG. 14, when a displacement in the longitudinal direction of the input wheel 104 is denoted by $X_1$, and a characteristic (complex spring constant) of the force with respect to a relative displacement ($X_1$–X) in the longitudinal direction between the input wheel 104 and the vehicle body 102 is denoted by $K_1$, the transmission force $F_1$ received by the vehicle body 102 from the input wheel 104 is represented by Expression (2).

$$F_1 = K_1(X_1 - X) \qquad (2)$$

As appreciated from Expression (2), the transmission force $F_1$ is determined by the characteristic $K_1$ of the force with respect to the relative displacement ($X_1$–X) in the longitudinal direction between the input wheel 104 and the vehicle body 102. Therefore, in order to decrease the transmission force $F_1$ received by the vehicle body 102 from the input wheel 104, thereby decreasing the vibration of the vehicle, hitherto, an elastic modulus of a rubber bush of a suspension 110$f$ of the input wheel 104 itself or the like is decreased to increase a longitudinal compliance of the suspension, thereby decreasing the value of the characteristic $K_1$. However, when the longitudinal compliance of the suspension 110$f$ is increased, travel stability of the vehicle decreases, and it is thus difficult to decrease the value of the characteristic $K_1$ without decreasing the travel stability of the vehicle.

The present disclosure focuses on such an effect that, for the input F in the longitudinal direction received from the road surface 108 by one of the two wheels 104 and 106 arranged so as to be separated in the longitudinal direction, and transmitted to the vehicle body, the other wheel acts as a dynamic damper, and optimally sets a characteristic in the vehicle longitudinal direction of the suspension for the other wheel to decrease the vibration of the vehicle.

As illustrated in FIG. 13 and FIG. 14, it can be considered that a complex spring 112$f$ for elastically deforming in the longitudinal direction exists between the front wheel 104, which is the input wheel of the vehicle 100, and the vehicle body 102, and a damping device 114$f$ for acting in the longitudinal direction exists between a tire of the front wheel 104 and the road surface 108. Similarly, it can be considered that a complex spring 112$r$ for elastically deforming in the longitudinal direction exists between the rear wheel 106, which is the non-input wheel, and the vehicle body 102, and a damping device 114$r$ for acting in the longitudinal direction exists between a tire of the rear wheel 106 and the road surface 108.

Thus, as a model of the vehicle 100 relating to the force and the displacement in the longitudinal direction, a simplified vehicle model 116 illustrated in FIG. 14 can be assumed. As illustrated in FIG. 14, the masses of the vehicle body 102 and the rear wheel 106 are respectively denoted by M and $m_2$. The longitudinal displacement of the rear wheel 106 is denoted by $X_2$, and a damping characteristic between the tire of the rear wheel 106 and the road surface 108 is denoted by $C_2$. The complex spring constant in the longitudinal direction of the suspension 100$r$ for the rear wheel 106 is denoted by $K_2$. As Expressions of motion in the longitudinal direction of the vehicle body 102 and the rear wheel 106 by the transmission force $F_1$, Expression (3) and Expression (4) are respectively satisfied.

$$MXs^2 = F_1 + K_2(X_2 - X) \qquad (3)$$

$$m_2 X_2 s^2 = -K_2(X_2 - X) - C_2 X_2 s \qquad (4)$$

The complex spring constant $K_2$ is a sum $K_{SUS} + C_{SUS}s$ of a spring constant $K_{SUS}$ in the longitudinal direction of the suspension 100$r$ and a product of a damping coefficient $C_{SUS}$ in the longitudinal direction of the suspension and the Laplacian s. While the spring constant $K_{SUS}$ is a real number, the product $C_{SUS}s$ of the damping coefficient $C_{SUS}$ and the Laplacian s is an imaginary number. In FIG. 14, the complex spring constant in the longitudinal direction of the suspension 100$f$ for the front wheel 104 is denoted by $K_1$, and the damping characteristic between the tire of the front wheel 104 and the road surface 108 is denoted by $C_1$.

Expressions (3) and (4) are rearranged to obtain Expressions (5) and (6).

$$(Ms^2 + K_2)X - K_2 X_2 = F_1 \qquad (5)$$

$$-K_2 X + (m_2 s^2 + K_2 + C_2 s)X_2 = 0 \qquad (6)$$

Expressions (5) and (6) can be rewritten as Expression (7) by representing Expressions (5) and (6) as a matrix.

$$\begin{bmatrix} X \\ X_2 \end{bmatrix} s^2 = \begin{bmatrix} Ms^2 + K_2 & -K_2 \\ -K_2 & m_2 s^2 + K_2 + C_2 s \end{bmatrix}^{-1} \begin{bmatrix} F_1 \\ 0 \end{bmatrix} s^2 \qquad (7)$$

On this occasion, the damping characteristic $C_2$ between the tire of the rear wheel 106 and the road surface 108 is represented by Expression (8), and $h_2(s)$ in Expression (8) is represented by Expression (9).

$$C_2 = \frac{1}{h_2(s)} \frac{P_2}{U} \qquad (8)$$

$$h_2(s) = 1 + \frac{P_2 r_2^2}{U I_{T2} s} + \frac{P_2 s}{U K_{TX2}} \qquad (9)$$

In Expressions (8) and (9), U denotes the vehicle speed, and $P_2$ denotes driving stiffness of the rear wheel 106. $r_2$ denotes the radius of the rear wheel 106, $I_{T2}$ denotes the moment of inertia of the rear wheel 106, and $K_{TX2}$ denotes a longitudinal spring constant of the tire of the rear wheel 106.

The sensitivity $Xs^2/F_1$ of the vehicle 104 to the longitudinal force is determined by an inverse matrix of the right side of Expression (7), and this inverse matrix includes the complex spring constant $K_2$ in the longitudinal direction of the suspension for the rear wheel 106, and the damping characteristic $C_2$ between the tire of the rear wheel 106 and the road surface 108. Thus, from Expression (7), it is appreciated that the sensitivity $Xs^2/F_1$ of the vehicle 104 to the longitudinal force can be adjusted by adjusting at least one of the complex spring constant $K_2$ and the damping characteristic $C_2$.

Both of the transmission force characteristic $F_1/F$ of the longitudinal force from the input wheel 104 to the vehicle body 102 and the sensitivity $Xs^2/F_1$ of the vehicle 104 to the longitudinal force depend on the frequency of the transmission force $F_1$ received by the vehicle body 102 from the input wheel 104. The transmission force characteristic $F_1/F$ and the sensitivity $Xs^2/F_1$ respectively have the frequency characteristics shown in FIG. 15 and FIG. 16.

Figure 15:
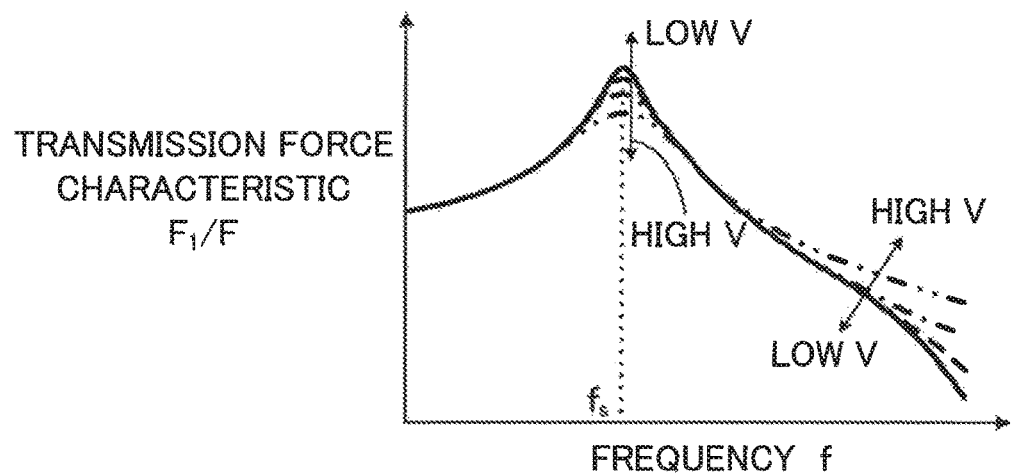
FIG. 15 is a chart for showing a frequency characteristic of a transmission force characteristic $F_1/F$ of the longitudinal force from an input wheel to the vehicle body.
Figure 16:
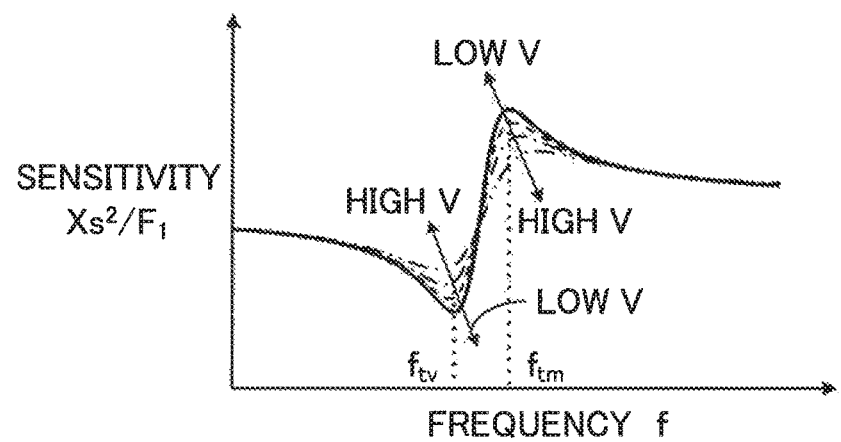
FIG. 16 is a chart for showing a frequency characteristic of the sensitivity $Xs^2/F_1$ of the vehicle to the longitudinal force.

As shown in FIG. 15, the frequency characteristic of the transmission force characteristic $F_1/F$ forms a sharp mountain shape presenting a peak value at a specific frequency $f_s$ unique to the transmission force characteristic. In contrast, as shown in FIG. 16, the frequency characteristic of the sensitivity $Xs^2/F_1$ forms a valley shape having a low value at a specific frequency $f_{rv}$ unique to the sensitivity, and forms a mountain shape having a high value at a specific frequency $f_{tm}$ unique to the sensitivity.

As described above, the transfer characteristic $Xs^2/F$ of the longitudinal force of the vehicle 100 is considered to be a product of the sensitivity $Xs^2/F_1$ of the vehicle 100 to the longitudinal force and the transmission force characteristic $F_1/F$ of the longitudinal force from the front wheel 104 to the vehicle body 102. Thus, in order to decrease the transfer characteristic $Xs^2/F$ of the longitudinal force, the specific frequency $f_s$ (referred to as "peak frequency $f_s$" depending on necessity) unique to the transmission force characteristic and the specific frequency $f_{rv}$ unique to the sensitivity are preferably as close to each other as possible. In other words, when the peak frequency $f_s$ and the specific frequency $f_{rv}$ unique to the sensitivity are greatly different from each other, the value of the transfer characteristic $Xs^2/F$ becomes a large value, and the displacement X in the longitudinal direction of the vehicle body 102 caused by the transmission force $F_1$ increases. In contrast, when the peak frequency $f_s$ and the specific frequency $f_{rv}$ unique to the sensitivity are the same value or values close to each other, the value of the transfer characteristic $Xs^2/F$ becomes a small value, and the displacement X in the longitudinal direction of the vehicle body 102 caused by the transmission force $F_1$ decreases.

Further, the specific frequencies $f_{rv}$ unique to the sensitivity and $f_{tm}$ can be changed by adjusting at least one of the complex spring constant $K_2$ in the longitudinal direction of the suspension 110r of the rear wheel 106 and the damping characteristic $C_2$ between the tire of the rear wheel 106 and the road surface 108. Thus, the longitudinal vibration of the vehicle body 102 caused by the transmission force $F_1$ acting on the input wheel 104 can be decreased by adjusting at least one of the complex spring constant $K_2$ and the damping characteristic $C_2$ between the tire of the rear wheel 106 and the road surface 108 so that the specific frequency $f_{rv}$ unique to the sensitivity and the specific frequency $f_s$ unique to the transmission force characteristic are the same value or values close to each other.

In a case where the wheel on which the input causing the longitudinal vibration of the vehicle body 102 acts, namely, the input wheel is the rear wheel 106, and the front wheel 104 located in the vehicle forward direction with respect to the input wheel is the non-input wheel, a vibration suppression effect similar to the above-mentioned vibration suppression effect can also be provided. In this case, the specific frequencies $f_{rv}$ unique to the sensitivity and $f_{tm}$ are adjusted by adjusting at least one of the complex spring constant $K_1$ in the longitudinal direction of the suspension 110r of the front wheel 104 and the damping characteristic $C_1$ between the tire of the front wheel 104 and the road surface 108.

In general, adjustable ranges of the damping characteristics $C_1$ and $C_2$ between the tires of the wheels and the road surface are limited. Thus, the complex spring constant $K_1$ or $K_2$ in the longitudinal direction of the suspension is preferably adjusted by priority before the damping characteristic $C_1$ or $C_2$ is adjusted.

Thus, according to this disclosure, the longitudinal vibration of the vehicle body caused by the transmission force acting on the input wheel is decreased by adjusting at least the complex spring constant of the non-input wheel so that the specific frequency $f_{rv}$ unique to the sensitivity is the same as or close to the specific frequency $f_s$ unique to the transmission force characteristic.

Now, with reference to the accompanying drawings, preferred embodiments of the present disclosure are described in detail.

[First Embodiment]

Figure 1:
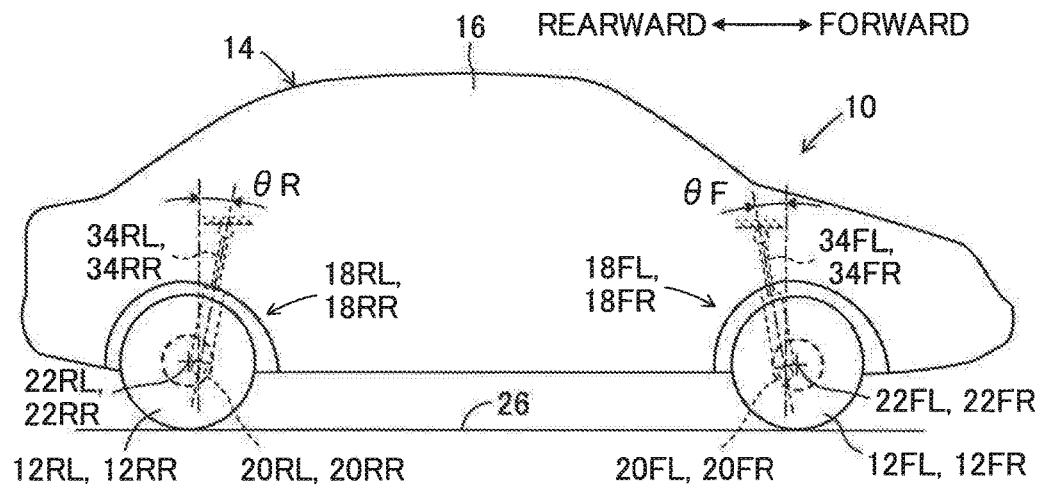
FIG. 1 is a side view for schematically illustrating a suspension device for a vehicle according to a first embodiment of the present disclosure.
Figure 2:
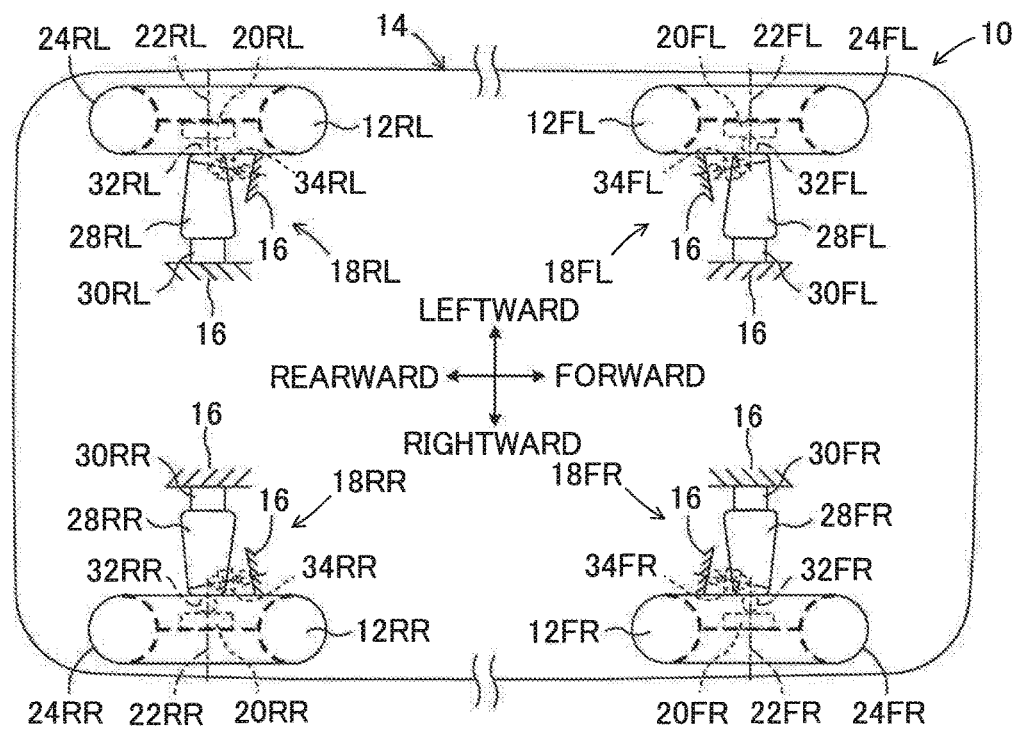
FIG. 2 is a plan view for schematically illustrating the suspension device for a vehicle according to the first embodiment.

FIG. 1 and FIG. 2 are respectively a side view and a plan view for illustrating an overview of a suspension device 10 for a vehicle according to a first embodiment of the present disclosure. As illustrated in those diagrams, the suspension device 10 is applied to a vehicle 14 including front left and right wheels 12FL and 12FR, which are steered wheels, and rear left and right wheels 12RL and 12RR, which are non-steered wheels. The suspension device 10 includes front wheel suspensions 18FL and 18FR for respectively suspending the front wheels 12FL and 12FR from a vehicle body 16, and rear wheel suspensions 18RL and 18RR for respectively suspending the rear wheels 12RL and 12RR from the vehicle body 16.

The front wheels 12FL and 12FR are supported for rotation about rotational axes 22FL and 22FR by wheel support members 20FL and 20FR corresponding to the front wheels 12FL and 12FR, and are in contact with a road surface 26 through tires 24FL and 24FR. Similarly, the rear wheels 12RL and 12RR are supported for rotation about rotational axes 22RL and 22RR by wheel support members 20RL and 20RR corresponding to the rear wheels 12RL and 12RR, and are in contact with the road surface 26 through tires 24RL and 24RR.

The front wheel 12FL and the rear wheel 12RL are arranged so as to be separated from each other in the vehicle longitudinal direction on a left side of the vehicle 14, and respectively function as first and second wheels on the left side of the vehicle 14. Similarly, the front wheel 12FR and the rear wheel 12RR are arranged so as to be separated from each other in the vehicle longitudinal direction on a right side of the vehicle 14, and respectively function as first and second wheels on the right side of the vehicle 14.

According to the first and other embodiments described later, the front wheels 12FL and 12FR are drive wheels and the rear wheels 12RL and 12RR are driven wheels. Structures of the front left and right wheel suspensions 18FL and 18FR are more complex than structures of the rear left and right wheel suspensions 18RL and 18RR. Thus, the degree of freedom for setting the complex spring constant $K_2$ in the longitudinal direction of the rear left and right wheel suspensions 18RL and 18RR is higher than the degree of freedom for setting the complex spring constant $K_1$ in the longitudinal direction of the front left and right wheel suspensions 18FL and 18FR.

The front wheel suspensions 18FL and 18FR respectively include suspension arms 28FL and 28FR. The suspension arms 28FL and 28FR are respectively coupled for swing to the vehicle body 16 at inner ends by rubber bush devices 30FL and 30FR, and are coupled for swing to the wheel support members 20FL and 20FR at outer ends by joints 32FL and 32FR, e.g., ball joints. In FIGS. 1 and 2, only one of the suspension arms 28FL or 28FR, one of the rubber bush devices 30FL and 30FR, and one of the joints 32FL and 32FR are illustrated, but a plurality of those members may be provided.

Similarly, the rear wheel suspensions 18RL and 18RR respectively include suspension arms 28RL and 28RR. The suspension arms 28RL and 28RR are respectively coupled for swing to the vehicle body 16 at inner ends by rubber bush devices 30RL and 30RR, and are coupled for swing to the wheel support members 20RL and 20RR at outer ends by joints 32RL and 32RR, e.g., ball joints. In FIGS. 1 and 2, only one of the suspension arms 28RL or 28RR, one of the rubber bush devices 30RL and 30RR, and one of the joints 32RL and 32RR are illustrated, but a plurality of those members may be provided.

Bottom ends of shock absorbers 34FL and 34FR are respectively coupled to the wheel support members 20FL and 20FR. Top ends of the shock absorbers 34FL and 34FR are coupled to the vehicle body 16. The top ends of the shock absorbers 34FL and 34FR are positioned at vehicle backward locations with respect to the bottom ends, and the shock absorbers 34FL and 34FR thus respectively extend while being inclined at least by $\theta F$ in the vehicle longitudinal direction. The inclination direction in the vehicle longitudinal direction of the shock absorbers 34FL and 34FR may be opposite to the direction illustrated in FIG. 1.

Similarly, bottom ends of shock absorbers 34RL and 34RR are respectively coupled to the wheel support members 20RL and 20RR. Top ends of the shock absorbers 34RL and 34RR are coupled to the vehicle body 16. The top ends of the shock absorbers 34RL and 34RR are positioned at vehicle forward locations with respect to the bottom ends, and the shock absorbers 34RL and 34RR thus respectively extend while being inclined at least by $\theta R$ in the vehicle longitudinal direction. The inclination direction in the vehicle longitudinal direction of the shock absorbers 34RL and 34RR may be opposite to the direction illustrated in FIG. 1.

Each of the rubber bush devices 30FL and 30RL includes an inner cylinder and an outer cylinder concentric with each other, and a rubber bush interposed between the inner cylinder and the outer cylinder, although those components are not illustrated in detail in FIG. 1 and FIG. 2. Thus, the rubber bushes of the rubber bush devices 30FL and 30RL function as main elastic bodies for respectively allowing displacement in the vehicle longitudinal direction of the front wheel 12FL and the rear wheel 12RL with respect to the vehicle body 16 on the left side of the vehicle 14. Further, the shock absorbers 34FL and 34RL respectively dampen vertical vibrations of the front wheel 12FL and the rear wheel 12RL with respect to the vehicle body 16 on the left side of the vehicle 14.

Similarly, each of the rubber bush devices 30FR and 30RR includes an inner cylinder and an outer cylinder concentric with each other, and a rubber bush interposed between the inner cylinder and the outer cylinder, although those components are not illustrated in detail in FIG. 1 and FIG. 2. Thus, the rubber bushes of the rubber bush devices 30FR and 30RR function as main elastic bodies for respectively allowing the displacement in the vehicle longitudinal direction of the front wheel 12FR and the rear wheel 12RR with respect to the vehicle body 16 on the right side of the vehicle 14. Further, the shock absorbers 34FR and 34RR respectively dampen vertical vibrations of the front wheel 12FR and the rear wheel 12RR with respect to the vehicle body 16 on the right side of the vehicle 14.

The suspensions 18FL to 18RR respectively include the shock absorbers 34FL and 34RR, and may be suspensions of any type as long as the wheels can allow displacement in the vehicle longitudinal direction with respect to the vehicle body 16 when the longitudinal force F acts on each of the wheels 12FL to 12RR. The suspensions 18FL to 18RR are preferably suspensions of the independent suspension type such as the Mcpherson strut type, the double wishbone type, the multilink type, and the swing arm type. However, the left and right suspensions may be coupled to each other as in a torsion beam type suspension as long as the complex spring constants in the longitudinal direction of the suspensions for the left and right wheels can be independently set. The front left and right wheel suspensions 18FL and 18FR have suspension characteristics that are the same as each other, and the rear left and right wheel suspensions 18RL and 18RR have suspension characteristics that are the same as each other.

Figure 3A:
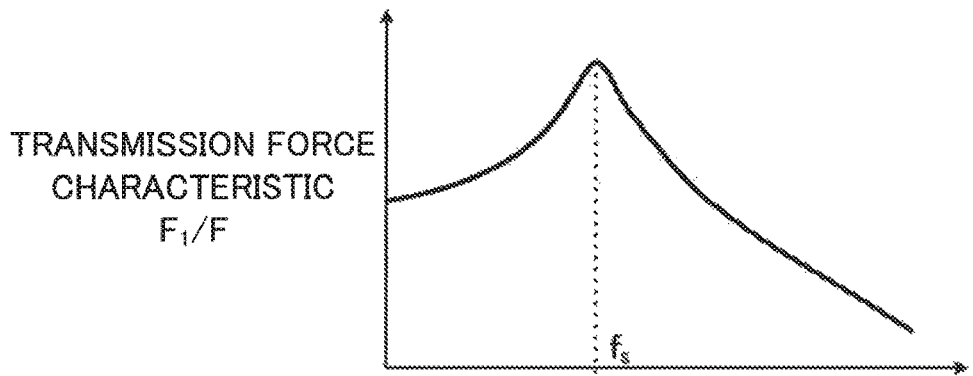
FIG. 3A, FIG. 3B, and FIG. 3C are charts for showing a transfer characteristic $F_1/F(A)$ and a sensitivity $Xs^2/F_1(B)$ of a vehicle according to the first embodiment.

The first longitudinal force input from the road surface 26 to each of the front wheels 12FL and 12FR is denoted by F. The transmission force received by the vehicle body 16 from each of the front wheels 12FL and 12FR is denoted by $F_1$. A transmission force characteristic $F_1/F$ of each of the front left and right wheel suspensions 18FL and 18FR has a frequency characteristic forming a sharp mountain shape illustrated in FIG. 3A when the front wheels 12FL and 12FR are the input wheels. As illustrated in FIG. 3A, the value of the transmission force characteristic $F_1/F$ presents a peak value when the frequency of the first longitudinal force F input to each of the front wheels 12FL and 12FR from the road surface 26 is a specific frequency $f_s$. Thus, the peak frequency of the transmission force characteristic $F_1/F$ is $f_s$.

Figure 3B:
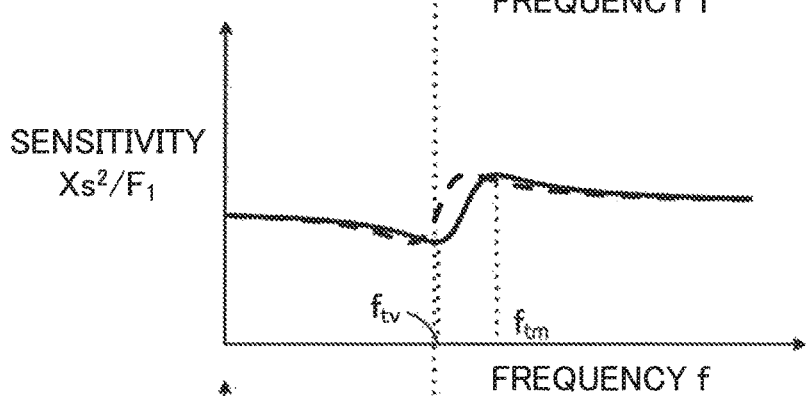

As illustrated as the solid line in FIG. 3B, when the front wheels 12FL and 12FR are the input wheels, the sensitivity $Xs^2/F_1$ of the vehicle 14 forms a gentle valley having a low value at the frequency $f_{tv}$, and forms a gentle mountain having a high value at the frequency $f_{tm}$. As illustrated as the solid line in FIG. 3C, the square of the product $(Xs^2/F_1)(F_1/F)$ of the sensitivity $Xs^2/F_1$ and the transmission force characteristic $F_1/F$, which is a first product, changes depending on the frequency of the longitudinal force F. Frequency characteristics of the transmission force characteristic $F_1/F$ and the sensitivity $Xs^2/F_1$ vary depending on the complex spring constant $K_2$ in the longitudinal direction of the rear left and right wheel suspensions 18RL and 18RR. Therefore, the peak frequency $f_s$ and the specific frequency $f_{tv}$ unique to the sensitivity have different values depending on the complex spring constant $K_2$. Thus, the maximum value of the square of the first product has a different value depending on the complex spring constant $K_2$.

The evaluation indication value E1 according to the first embodiment is the maximum value of the square of the first product in a predetermined frequency range of from fl to fh set in advance, and is represented by Expression (10). In Expression (10), MAX means the maximum value out of values contained in square brackets, which vary depending on a condition such as the compliance of the rear wheel suspensions 18RL and 18RR, and this holds true for the following other expressions described later.

$$E1 = \text{MAX}[\{(Xs^2/F_1)(F_1/F)\}^2] \quad (10)$$

A lower limit value fl and a higher limit value fh of the predetermined frequency range are respectively $f_s-\Delta fl$ and $f_s+\Delta fh$ where $\Delta fl$ and $\Delta fh$ are positive constants. Thus, the predetermined frequency range of from fl to fh is set to include the peak frequency $f_s$. $\Delta fl$ and $\Delta fh$ may be the same value or values different from each other. The predetermined frequency range of from fl to fh is preferably set in consideration of a frequency band Bpl to Bph so as to include at least a part of the frequency band Bpl to Bph in which a passenger of the vehicle is likely to feel the longitudinal vibration of the vehicle body 16.

According to the first embodiment, the complex spring constant $K_2$ in the longitudinal direction of the rear left and right wheel suspensions 18RL and 18RR is set so that the evaluation indication value E1 takes a minimum value E1 min. In other words, the complex spring constant $K_2$ when the evaluation indication value E1 takes the minimum value E1 min is denoted by a target complex spring constant $K_{2t}$, and the complex spring constant $K_2$ is set to the target complex spring constant $K_{2t}$. As described later, the evaluation indication value E1 takes the minimum value E1 min when the frequency $f_{tv}$ corresponding to the valley of the sensitivity $Xs^2/F_1$ is set to a value substantially the same as the peak frequency $f_s$.

The complex spring constant $K_2$ is set, for example, in the following manner. First, an inclination angle θR of the shock absorbers 34RL and 34RR in the vehicle longitudinal direction is set to a lower limit value θRmin in an adjustment range of from θRmin to θRmax set in advance. Both of the lower limit value θRmin and the upper limit value θRmax of the adjustment range are positive constants.

Then, the spring constant of the rubber bush devices 30RL and 30RR of the rear left and right wheel suspensions 18RL and 18RR and the like are set to various values, and the square of the first product $(Xs^2/F_1)(F_1/F)$ is calculated by simulation or experimentally. The maximum value out of the plurality of calculated squares of the first product is determined to be the evaluation indication value E1 for the case where the inclination angle θR is the lower limit value θRmin. The evaluation indication value E1 is determined for each of the inclination angles θR by stepwise incrementing the inclination angle θR by ΔθR (positive constant) at a time from the lower limit value θRmin to the upper limit value θRmax, and carrying out the above-mentioned procedure for each of the inclination angles θR.

The minimum value E1 min out of the plurality of evaluation indication values E1 determined in this way is identified, and the spring constants and the like of the rubber bush devices 30FR and 30RR and the inclination angle θR in the vehicle longitudinal direction of the shock absorbers 34RL and 34RR corresponding to the minimum value E1 min are identified. An optimal complex spring constant $K_2$ of the rear wheel suspensions 18RL and 18RR in the longitudinal direction is uniquely determined by the compliance in the vehicle longitudinal direction of the rear wheel suspensions 18RL and 18RR and the inclination angle θR identified as described above. Thus, the compliance in the vehicle longitudinal direction of the rear left and right wheel suspensions 18RL and 18RR and the inclination angle θR in the vehicle longitudinal direction of the shock absorbers 34RL and 34RR are respectively set to the identified values, and, as a result, the complex spring constant $K_2$ is set to the optimal value. In this case, a specific value of the complex spring constant $K_2$ does not need to be acquired. This holds true for other embodiments described later.

As described above, the front left and right wheel suspensions 18FL and 18FR have the suspension characteristics that are the same as each other, and the rear left and right wheel suspensions 18RL and 18RR have the suspension characteristics that are the same as each other. Thus, the compliance in the vehicle longitudinal direction and the inclination angle θR in the vehicle longitudinal direction of the shock absorber 34RL or 34RR are acquired for one of the rear left and right wheel suspensions 18RL and 18RR. The compliance in the vehicle longitudinal direction and the inclination angle θR in the vehicle longitudinal direction of the shock absorber 34RL or 34RR of the other one of the rear left and right wheel suspensions 18RL and 18RR are respectively set to the above-mentioned acquired values.

Figure 3C:
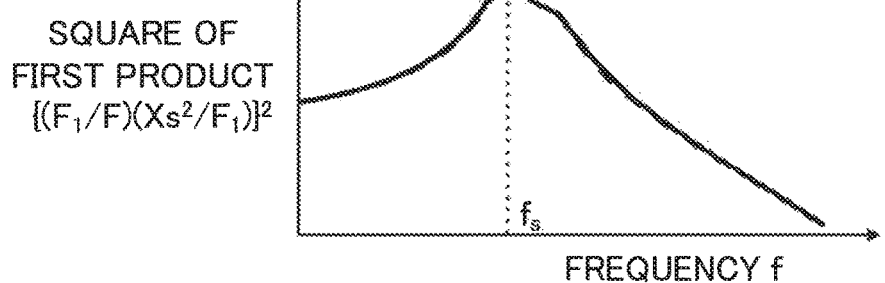

As described above, when the complex spring constant $K_2$ in the longitudinal direction of the rear wheel suspensions 18RL and 18RR is set, the square of the first product, which is the product of the sensitivity $Xs^2/F_1$ and the transmission force characteristic $F_1/F$, has a frequency characteristic represented by the solid line of FIG. 3C. The peak value of the sensitivity $Xs^2/F_1$ is lower than that in a case where the frequency $f_{tv}$ is not substantially the same value as the peak frequency $f_s$. For example, in a comparative example in which the sensitivity $Xs^2/F_1$ of the vehicle has a frequency characteristic represented by the broken line of FIG. 3B, the square of the first product has a frequency characteristic represented by the broken line of FIG. 3C. Thus, according to the first embodiment, the peak value of the square of the first product at the peak frequency $f_s$ and a vicinity of the peak frequency $f_s$ can be lowered compared with the comparative example. As a result, the peak of the longitudinal vibration of the vehicle body 16 can be decreased when the longitudinal forces are received by the front wheels.

In this case, a ratio of a vehicle body excitation force to the longitudinal force F input to each of the front wheels 12FL and 12FR can be decreased by setting the complex spring constant $K_2$ in the vehicle longitudinal direction of the suspension 18RL or 18RR for the rear wheel without increasing the longitudinal compliance of the suspensions 18FL and 18FR of the front wheels, to each of which the longitudinal force F is input. Thus, the longitudinal vibration of the vehicle body 16 caused by the longitudinal force F input to each of the front wheels 12FL and 12FR can be decreased, thereby increasing ride comfort of the vehicle 14 without a decrease in operation stability of the vehicle 14 caused by an increase in the longitudinal compliance of the suspensions 18FL and 18FR for the front wheels. These actions and effects are similarly provided in other embodiments described later.

[Second Embodiment]

The evaluation indication value according to a second embodiment of the present disclosure is the maximum value of the product of a gain G and the square of the first product $(Xs^2/F_1)(F_1/F)$ in the predetermined frequency range of from fl to fh set in advance, and is denoted by E2 represented by Expression (11).

$$E2 = \text{MAX}[G\{(Xs^2/F_1)(F_1/F)\}^2] \quad (11)$$

The gain G is a gain for reflecting a degree of how likely the passenger of the vehicle 14 is to feel the longitudinal vibration of the vehicle body 16 when the longitudinal force F is input to each of the front wheels 12FL and 12FR, and functions as a first coefficient. Specifically, the predetermined frequency range of from fl to fh is divided into a plurality of frequency regions $F_1$ to $F_n$ (n is a positive constant integer). The gain G is set to a value that is equal to or more than 0 and equal to or less than 1 for each of the frequency regions $F_1$ to $F_n$ so as to increase as the passenger of the vehicle is more likely to feel the longitudinal vibration of the vehicle body 16.

According to the second embodiment, in the same manner as that according to the first embodiment, the complex spring constant $K_2$ in the longitudinal direction of the rear left and right wheel suspensions 18RL and 18RR is set so that the evaluation indication value E2 takes a minimum value E2 min. In other words, the complex spring constant $K_2$ when the evaluation indication value E2 takes the minimum value E2 min is denoted by a target complex spring constant $K_{2t}$, and the complex spring constant $K_2$ is set to the target complex spring constant $K_{2t}$.

Specifically, the evaluation indication value E2 is determined for each of the inclination angles θR by stepwise incrementing the inclination angle θR by ΔθR at a time from the lower limit value θRmin to the upper limit value θRmax, and carrying out the following procedure for each of the inclination angles θR. In other words, the spring constant of the rubber bush devices 30RL and 30RR and the like are set to various values for each of the inclination angles θR, the product of the gain G and the square of the first product $(Xs^2/F_1)(F_1/F)$ is calculated by simulation or experimentally, and the maximum value out of the plurality of calculated products is determined to be the evaluation indication value E2.

The minimum value E2 min out of the plurality of evaluation indication values E2 determined in this way is identified. Further, the compliance in the vehicle longitudinal direction of the rear wheel suspensions 18RL and 18RR and the inclination angle θR in the vehicle longitudinal direction of the shock absorbers 34RL and 34RR are respectively set to values corresponding to the minimum value E2 min. As a result, the complex spring constant $K_2$ is set to the optimal value.

According to the second embodiment, the evaluation indication value E2 is the maximum value of the product of the gain G and the square of the first product $(Xs^2/F_1)(F_1/F)$ in the predetermined frequency range of from fl to fh set in advance. The gain G is set to a value that increases as the passenger of the vehicle is more likely to feel the longitudinal vibration of the vehicle body 16 for each of the plurality of frequency regions $F_1$ to $F_n$ of the predetermined frequency range of from fl to fh. Thus, the evaluation indication value E2 can be increased as the passenger of the vehicle is more likely to feel the longitudinal vibration of the vehicle body 16 caused by the first longitudinal force. The gain G is preferably set in consideration of the weighting prescribed by ISO02631 so that the gain is high for a frequency that is likely to affect a human.

The complex spring constant $K_2$ in the vehicle longitudinal direction of the rear wheel suspensions 18RL and 18RR is set to a value corresponding to the minimum value E2 min out of the plurality of evaluation indication values E2. Thus, the complex spring constant $K_2$ can be set to the optimal value so that the ratio $(Xs^2/F)$ of the vehicle body excitation force to the longitudinal force F decreases in consideration of how likely the passenger of the vehicle 14 is to feel the longitudinal vibration of the vehicle body caused by the longitudinal force F input to each of the front wheels in the predetermined frequency range of from fl to fh. Thus, compared with the case where how likely the passenger of the vehicle is to feel the longitudinal vibration of the vehicle body is not considered, the longitudinal vibration of the vehicle body in the frequency range in which the passenger is likely to feel the longitudinal vibration of the vehicle body caused by the longitudinal force F can be decreased.

[Third Embodiment]

Figure 4:
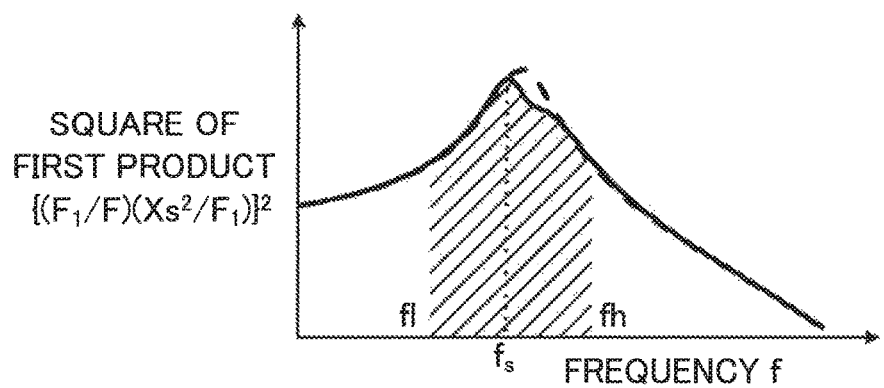
FIG. 4 is an explanatory diagram for showing a point of setting a complex spring constant $K_2$ in a longitudinal direction of rear left and right wheel suspensions in a suspension device for a vehicle according to a second embodiment of the present disclosure.

FIG. 4 is an explanatory diagram for showing a point of adjusting the complex spring constant $K_2$ in the longitudinal direction of the rear left and right wheel suspensions 18RL and 18RR in the suspension device 10 for a vehicle according to a third embodiment of the present disclosure.

According to the third embodiment, the resonance frequency of unsprung portions of the front left and right wheels (respectively the front wheels 12FL and 12FR and the wheel support members 20FL and 20FR) is denoted by $f_r$, and the predetermined frequency range of from fl to fh is set in advance so as to include the resonance frequency $f_r$ and the peak frequency $f_s$. Also according to this embodiment, the predetermined frequency range of from fl to fh is preferably set in consideration of the frequency band Bpl to Bph so as to include at least a part of the frequency band Bpl to Bph in which the passenger of the vehicle 14 is likely to feel the longitudinal vibration of the vehicle body 16. Those configurations are similarly set in a sixth embodiment of the present disclosure described later.

The evaluation indication value according to the third embodiment is denoted by E3 represented by Expression (12). As shown in FIG. 4 showing a relationship between the square of the first product $(Xs^2/F_1)(F_1/F)$ and the frequency f, the value of the evaluation indication value E3 is equal to the area of a hatched region below a curve of the square of the first product in the predetermined frequency range of from fl to fh.

$$E3=\int_{fl}^{fh}\{(Xs^2/F_1)(F_1/F)\}^2 df \qquad (12)$$

According to the third embodiment, the complex spring constant $K_2$ in the longitudinal direction of the rear wheel suspensions 18RL and 18RR is set so that the evaluation indication value E3 takes a minimum value E3 min in the same manner as that according to the first and second embodiments, except for the point that the evaluation indication value E3 is calculated through Expression (12). In other words, the complex spring constant $K_2$ when the evaluation indication value E3 takes the minimum value E3 min is denoted by the target complex spring constant $K_{2t}$, and the complex spring constant $K_2$ is set to the target complex spring constant $K_{2t}$.

Specifically, the inclination angle θR in the vehicle longitudinal direction of the shock absorbers 34RL and 34RR is set to the lower limit value θRmin as in the first embodiment. The spring constant of the rubber bush devices 30RL and 30RR and the like are set to various values, and the evaluation indication value E3 is calculated by simulation or experimentally through Expression (12). The evaluation indication value E3 is calculated for each of the inclination angles θR by stepwise incrementing the inclination angle θR by ΔθR at a time from the lower limit value θRmin to the upper limit value θRmax, and calculating the evaluation indication value E3 in the manner described above for each of the inclination angles θR.

The minimum value E3 min out of the plurality of evaluation indication values E3 calculated in this way is identified. Further, the compliance in the vehicle longitudinal direction of the rear wheel suspensions 18RL and 18RR and the inclination angle θR in the vehicle longitudinal direction of the shock absorbers 34RL and 34RR are respectively set to values corresponding to the minimum value E3 min, and, as a result, the complex spring constant $K_2$ is set to the optimal value.

According to the third embodiment, a value in square brackets of the evaluation indication value E3 is a value acquired by integrating the square of the first product $(X s^2/F_1)(F_1/F)$ over the predetermined frequency range of from fl to fh, and is equal to the area of the hatched region of FIG. 4. Thus, the evaluation indication value E3 is a value acquired by accumulating the values of the ratio $(X s^2/F)$ of the vehicle body excitation force to the longitudinal force F input to each of the front wheels over the predetermined frequency range of from fl to fh. Thus, the ratio $(X s^2/F)$ of the vehicle body excitation force to the longitudinal force F input to each of the front wheels can be decreased over the entire predetermined frequency range of from fl to fh, thereby decreasing the longitudinal vibration of the vehicle body 16 in the state where the longitudinal force F is input to each of the front wheels.

In particular, according to the third embodiment, the predetermined frequency range of from fl to fh is set in advance so as to include the sprung resonance frequency $f_r$ of the front wheels and the peak frequency $f_s$. Thus, the sprung resonance of the front wheels can be decreased, and the excitation of the vehicle body by the sprung resonance of the front wheels can thus also be decreased compared with a case where the predetermined frequency range of from fl to fh does not include the sprung resonance frequency $f_r$ of the front wheels. The predetermined frequency range of from fl to fh may not include the sprung resonance frequency $f_r$ of the front wheels.

[Fourth Embodiment]

Figure 5A:
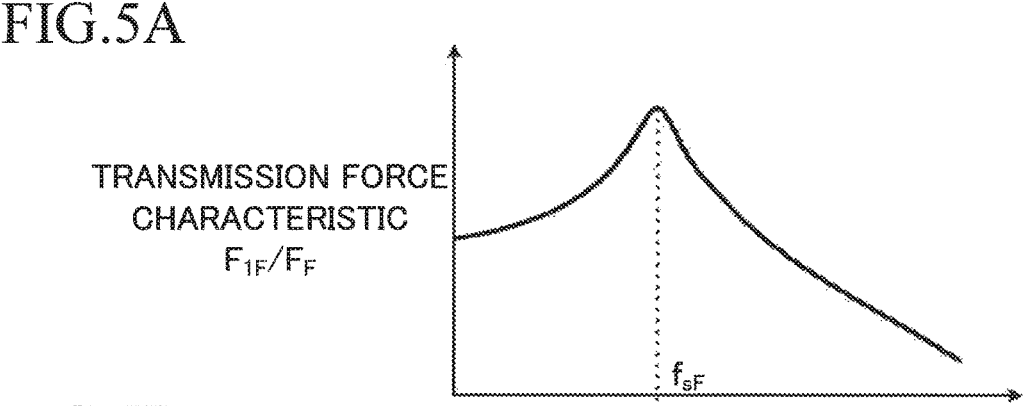
FIG. 5A, FIG. 5B, FIG. 5C, and FIG. 5D are explanatory diagrams each for showing a point of setting the complex spring constant $K_2$ in a longitudinal direction of rear left and right wheel suspensions in a suspension device for a vehicle according to a fourth embodiment of the present disclosure.
Figure 5B:
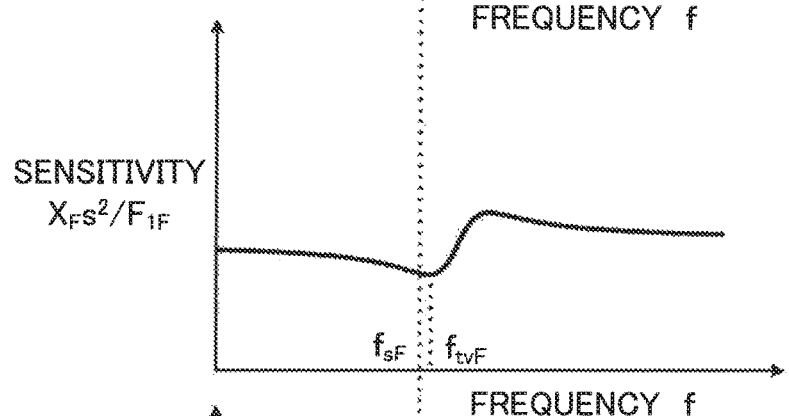

FIG. 5A, FIG. 5B, FIG. 5C, and FIG. 5D are explanatory diagrams each for showing a point of setting the complex spring constant $K_2$ in the longitudinal direction of the rear left and right wheel suspensions 18RL and 18RR in the suspension device 10 for a vehicle according to a fourth embodiment of the present disclosure. FIG. 5A and FIG. 5B respectively correspond to FIG. 3A and FIG. 3B. In this embodiment and other embodiments described later, suffixes "F" and "R" respectively denote the front wheels and the rear wheels.

According to the first to third embodiments, the front wheels 12FL and 12FR are the input wheels, and the rear wheels 12RL and 12RR are the non-input wheels. In an actual vehicle, the longitudinal forces are input from the road surface to any of the front wheels and the rear wheels. Thus, according to this embodiment, the complex spring constant $K_2$ in the longitudinal direction of the rear left and right suspensions 18RL and 18RR is set so that the longitudinal vibration of the vehicle body caused by the input of the longitudinal forces to the rear wheels decreases as much as possible.

Figure 5C:
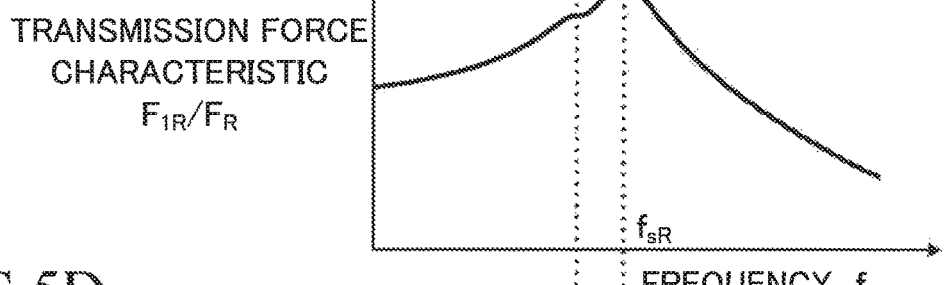
Figure 5D:
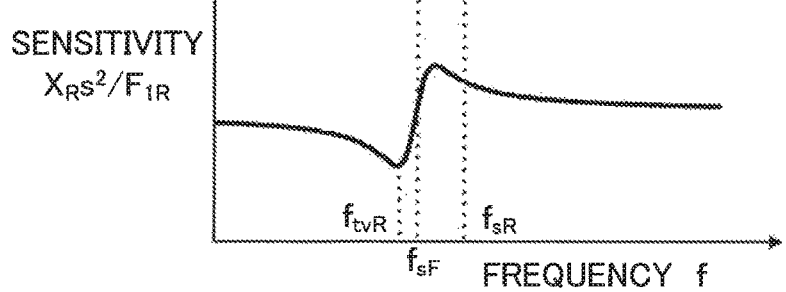

It is assumed that a longitudinal force $F_F$ is input to each of the front wheels 12FL and 12FR and a longitudinal force $F_R$ is input to each of the rear wheels 12RL and 12RR in the vehicle 14 having the vibration characteristics shown in FIG. 3A to FIG. 3C. A transmission force received by the vehicle body 16 from each of the front wheels 12FL and 12FR is denoted by $F_{1F}$, and a transmission force received by the vehicle body 16 from each of the rear wheels 12RL and 12RR is denoted by $F_{1R}$. A transmission force characteristic $F_{1R}/F_R$ of the longitudinal force from each of the rear wheels 12RL and 12RR to the vehicle body 16, and a sensitivity $X_R s^2/F_{1R}$ of the vehicle 14 to the longitudinal force generally respectively have the frequency characteristics illustrated in FIG. 5C and FIG. 5D. As shown in FIG. 5C, a specific frequency $f_{sR}$ at which the transmission force characteristic $F_{1R}/F_R$ in the rear wheel presents a peak value is different from a specific frequency $f_{sF}$ at which the transmission force characteristic $F_{1F}/F_F$ in the front wheel presents a peak value. Similarly, as shown in FIG. 5D, a specific frequency $f_{nR}$ at which the sensitivity $X_R s^2/F_{1R}$ in the rear wheel presents a valley value is different from a specific frequency $f_{nF}$ at which the sensitivity $X_F s^2/F_{1F}$ in the front wheel presents a valley value.

The evaluation indication value according to the fourth embodiment is denoted by E4 represented by Expression (13). A product $(X_R s^2/F_{1R})(F_{1R}/F_R)$ of the transmission force characteristic $F_{1R}/F_R$ and the sensitivity $X_R s^2/F_{1R}$ in the rear wheel is referred to as second product. As appreciated from a comparison with the evaluation indication value E1 according to the first embodiment, the evaluation indication value E4 is the maximum value of a sum of the square of the first product $(X_F s^2/F_{1F})(F_{1F}/F_F)$ and the square of the second product $(X_R s^2/F_{1R})(F_{1R}/F_R)$.

$$E4 = \mathrm{MAX}[\{(X_F s^2/F_{1F})(F_{1F}/F_F)\}^2 + \{(X_R s^2/F_{1R})(F_{1R}/F_R)\}^2] \quad (13)$$

According to the fourth embodiment, the complex spring constant $K_2$ in the longitudinal direction of the rear wheel suspensions 18RL and 18RR is set so that the evaluation indication value E4 takes a minimum value E4 min in the same manner as that of the above-mentioned other embodiments. In other words, the complex spring constant $K_2$ when the evaluation indication value E4 takes the minimum value E4 min is denoted by the target complex spring constant $K_{2t}$, and the complex spring constant $K_2$ is set to the target complex spring constant $K_{2t}$.

Specifically, the evaluation indication value E4 is determined for each of the inclination angles θR by stepwise incrementing the inclination angle θR by ΔθR at a time from the lower limit value θRmin to the upper limit value θRmax, and carrying out the following procedure for each of the inclination angles θR. In other words, the spring constant of the rubber bush devices 30RL and 30RR and the like are set to various values for each of the inclination angles θR, the sum of the square of the first product and the square of the second product is calculated by simulation or experimentally, and the maximum value out of the plurality of calculated sums is determined to be the evaluation indication value E4.

The minimum value E4 min out of the plurality of evaluation indication values E4 calculated in this way is identified. Further, the compliance in the vehicle longitudinal direction of the rear wheel suspensions 18RL and 18RR and the inclination angle θR in the vehicle longitudinal direction of the shock absorbers 34RL and 34RR are respectively set to values corresponding to the minimum value E4 min. As a result, the complex spring constant $K_2$ is set to the optimal value.

Figure 6:
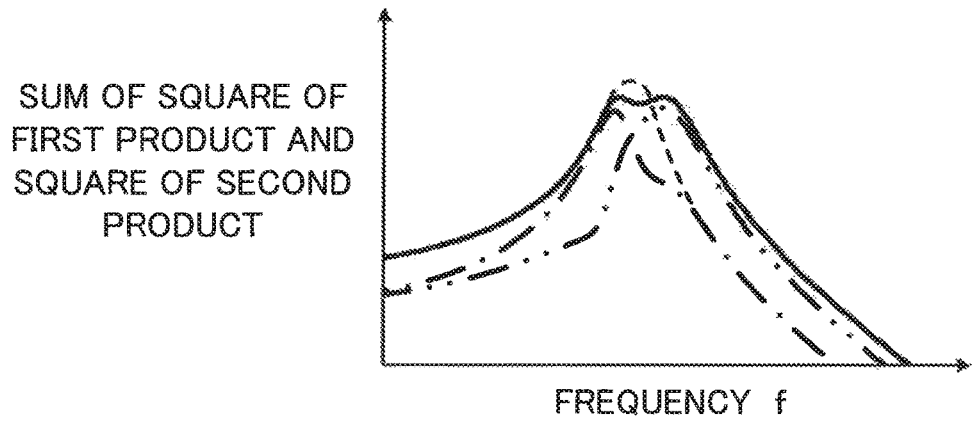
FIG. 6 is a chart for showing a composite transfer characteristic of a longitudinal force from a front wheel to a vehicle body along with other various transfer characteristics according to the fourth embodiment.

In FIG. 6, the solid line represents the composite transfer characteristic when the longitudinal force $F_F$ is input to each of the front wheels 12FL and 12FR and the longitudinal force $F_R$ is input to each of the rear wheels 12RL and 12RR, namely, the sum of the square of the first product and the square of the second product. The long dashed short dashed line represents a transfer characteristic when the longitudinal force $F_F$ is input to each of the front wheels 12FL and 12FR. The long dashed double-short dashed line represents a transfer characteristic when the longitudinal force $F_R$ is input to each of the rear wheels 12RL and 12RR. Further, the broken line represents the frequency characteristic of the comparative example shown in FIG. 3C described above.

According to the fourth embodiment, the evaluation indication value E4 is the maximum value of the sum of the square of the first product $(X_F s^2/F_{1F})(F_{1F}/F_F)$ and the square of the second product $(X_R s^2/F_{1R})(F_{1R}/F_R)$. The first product $(X_F s^2/F_{1F})(F_{1F}/F_F)$ corresponds to a ratio $(X_F s^2/F_F)$ of the vehicle body excitation force to the longitudinal force $F_F$ input to each of the front wheels. The second product $(X_R s^2/F_{1R})(F_{1R}/F_R)$ corresponds to a ratio $(X_R s^2/F_R)$ of the vehicle body excitation force to the longitudinal force $F_R$ input to each of the rear wheels. Thus, the evaluation indication value E4 can be used to determine the sum of the magnitude of the ratio $(X_F s^2/F_F)$ of the vehicle body excitation force to the longitudinal force $F_F$ input to each of the front wheels and the magnitude of the ratio $(X_R s^2/F_R)$ of the vehicle body excitation force to the longitudinal force $F_R$ input to each of the rear wheels.

Moreover, according to the fourth embodiment, the minimum value E4 min out of the plurality of evaluation indication values E4 is identified. Further, the compliance in the vehicle longitudinal direction of the rear wheel suspensions 18RL and 18RR and the inclination angle θR in the vehicle longitudinal direction of the shock absorbers 34RL and 34RR are respectively set to the values corresponding to the minimum value E4 min. As a result, the complex spring constant $K_2$ is set to the optimal value. As a result, the complex spring constant $K_2$ can be set so that the sum of the magnitude of the ratio $(X_F s^2/F_F)$ of the vehicle body excitation force to the longitudinal force $F_F$ input to each of the front wheels and the magnitude of the ratio $(X_R s^2/F_R)$ of the vehicle body excitation force to the longitudinal force $F_R$ input to each of the rear wheels is minimized. Thus, the longitudinal vibration of the vehicle body 16 can be decreased in the state where the longitudinal forces are input to the front wheels and the rear wheels.

[Fifth Embodiment]

The evaluation indication value according to a fifth embodiment of the present disclosure is denoted by E5 represented by Expression (14). A value in square brackets of a first term of Expression (14) is a product of a gain G1 and the square of the first product and a value in square brackets of a second term is a product of a gain G2 and the square of the second product.

$$E5 = \mathrm{MAX}[G1\{(X_F s^2/F_{1F})(F_{1F}/F_F)\}^2 + G2\{(X_R s^2/F_{1R})(F_{1R}/F_R)\}^2] \qquad (14)$$

In Expression (14), similar to the gain G according to the second embodiment, the gain G1 is a gain for reflecting the degree of how likely the passenger of the vehicle 14 is to feel the longitudinal vibration of the vehicle body 16 when the longitudinal force $F_F$ is input to each of the front wheels 12FL and 12FR, and functions as the first coefficient. The gain G2 is a gain for reflecting the degree of how likely the passenger of the vehicle 14 is to feel the longitudinal vibration of the vehicle body 16 when the longitudinal force $F_R$ is input to each of the rear wheels 12RL and 12RR, and functions as the second coefficient. Specifically, the predetermined frequency range of from fl to fh is divided into the plurality of frequency regions $F_1$ to $F_n$, and each of the gains G1 and G2 is set to a value equal to or more than 0 and equal to or less than 1 for each of the frequency regions $F_1$ to $F_n$ so as to increase as the passenger of the vehicle is more likely to feel the longitudinal vibration of the vehicle body 16.

According to the fifth embodiment, the complex spring constant $K_2$ in the longitudinal direction of the rear wheel suspensions 18RL and 18RR is set so that the evaluation indication value E5 takes a minimum value E5 min in the same manner as that of the above-mentioned other embodiments. In other words, the complex spring constant $K_2$ when the evaluation indication value E5 takes the minimum value E5 min is denoted by the target complex spring constant $K_{2t}$, and the complex spring constant $K_2$ is set to the target complex spring constant $K_{2t}$.

Specifically, the evaluation indication value E5 is determined for each of the inclination angles θR by stepwise incrementing the inclination angle θR by ΔθR at a time from the lower limit value θRmin to the upper limit value θRmax, and carrying out the following procedure for each of the inclination angles θR. In other words, the spring constant of the rubber bush devices 30RL and 30RR and the like are set to various values for each of the inclination angles θR, the sum of the product of the gain G1 and the square of the first product and the product of the gain G2 and the square of the second product is calculated by simulation or experimentally, and the maximum value out of the plurality of calculated sums is determined to be the evaluation indication value E5.

The minimum value E5 min out of the plurality of evaluation indication values E5 calculated in this way is identified. Further, the compliance in the vehicle longitudinal direction of the rear wheel suspensions 18RL and 18RR and the inclination angle θR in the vehicle longitudinal direction of the shock absorbers 34RL and 34RR are respectively set to values corresponding to the minimum value E5 min. As a result, the complex spring constant $K_2$ is set to the optimal value.

According to the fifth embodiment, the evaluation indication value E5 is the maximum value of the sum $G1\{(X_F s^2/F_{1F})(F_{1F}/F_F)\}^2 + G2\{(X_R s^2/F_{1R})(F_{1R}/F_R)\}^2$ of the product of the gain G1 and the square of the first product and the product of the gain G2 and the square of the second product. The gains G1 and G2 are set so as to increase as the passenger of the vehicle is more likely to feel the longitudinal vibration of the vehicle body 16 in the predetermined frequency range of from fl to fh. Also in this embodiment, the gains G1 and G2 are preferably set in consideration of the weighting prescribed by ISO02631 so that a gain is high for a frequency that is likely to affect a human.

Thus, the complex spring constant $K_2$ in the longitudinal direction of the rear wheel suspensions 18RL and 18RR can be set so that the ratio of the vehicle body excitation force to the longitudinal force decreases as the passenger of the vehicle 14 is more likely to feel the longitudinal vibration of the vehicle body caused by the longitudinal forces $F_F$ and $F_R$ in the predetermined frequency range of from fl to fh. Thus, compared with the case where how likely the passenger of the vehicle is to feel the longitudinal vibration of the vehicle body is not considered, the longitudinal vibration of the vehicle body in the frequency range in which the passenger is likely to feel the longitudinal vibration of the vehicle body caused by the longitudinal forces $F_F$ and $F_R$ can be decreased.

[Sixth Embodiment]

Figure 7:
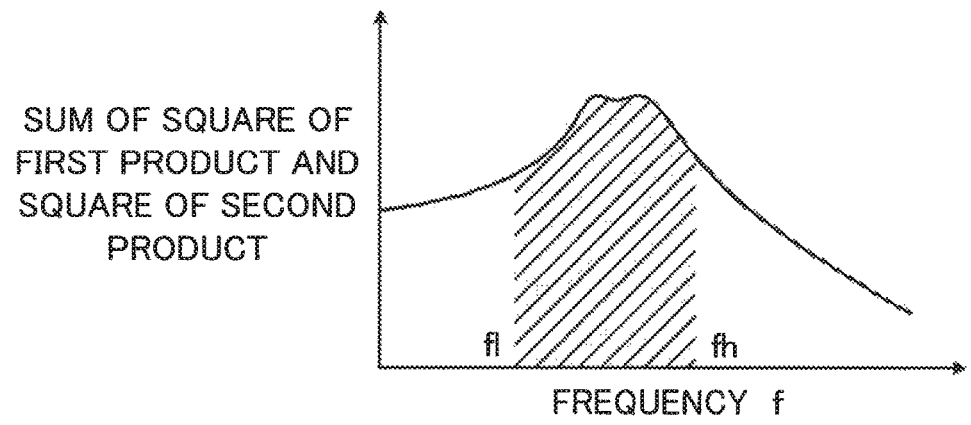
FIG. 7 is an explanatory diagram for showing a point of setting the complex spring constant $K_2$ in a longitudinal direction of rear left and right wheel suspensions in a suspension device for a vehicle according to a sixth embodiment of the present disclosure.

FIG. 7 is an explanatory diagram for showing a point of setting the complex spring constant $K_2$ in the longitudinal direction of the rear left and right wheel suspensions 18RL and 18RR in the suspension device 10 for a vehicle according to a sixth embodiment of the present disclosure.

The evaluation indication value according to the sixth embodiment is denoted by E6 represented by Expression (15). FIG. 7 is a chart for illustrating a relationship between the sum of the square of the first product when the front wheels are the input wheels and the square of the second product when the rear wheels are input wheels and the frequency f. In FIG. 7, the value of the evaluation indication value E6 is equal to the area of a hatched region below a curve of the sum from the lower limit value fl to the upper limit value fh in the predetermined frequency range.

$$E6 = \int_{fl}^{fh} [\{(X_F s^2/F_{1F})(F_{1F}/F_F)\}^2 + \{(X_R s^2/F_{1R})(F_{1R}/F_R)\}^2] df \quad (15)$$

According to the sixth embodiment, the evaluation indication value E6 is calculated, and a minimum value E6 min out of the calculated evaluation indication values E6 is determined in the same manner as that of the third embodiment except that the evaluation indication value E3 is replaced by the evaluation indication value E6. Further, the compliance in the vehicle longitudinal direction of the rear wheel suspensions 18RL and 18RR and the inclination angle θR in the vehicle longitudinal direction of the shock absorbers 34RL and 34RR are respectively set to values corresponding to the minimum value E6 min. As a result, the complex spring constant $K_2$ is set to the optimal value. In other words, the complex spring constant $K_2$ when the evaluation indication value E6 takes the minimum value E6 min is denoted by the target complex spring constant $K_{2t}$, and the complex spring constant $K_2$ is set to the target complex spring constant $K_{2t}$.

According to the sixth embodiment, the evaluation indication value E6 is a value acquired by accumulating the sum of the square of the ratio of the vehicle body excitation force caused by the longitudinal force $F_F$ to the longitudinal force $F_F$ and the square of the ratio of the vehicle body excitation force caused by the longitudinal force $F_R$ to the longitudinal force $F_R$ for the predetermined frequency range of from fl to fh. Thus, the sum of the ratio of the vehicle body excitation force to the longitudinal force $F_F$ input to each of the front wheels and the ratio of the vehicle body excitation force to the longitudinal force $F_R$ input to each of the rear wheels can be decreased over the entire predetermined frequency range of from fl to fh. Thus, the longitudinal vibration of the vehicle body 16 can be decreased in the state where the longitudinal forces $F_F$ and $F_R$ are respectively input to the front wheels and the rear wheels over the entire predetermined frequency range of from fl to fh.

[Seventh Embodiment]

Figure 8:
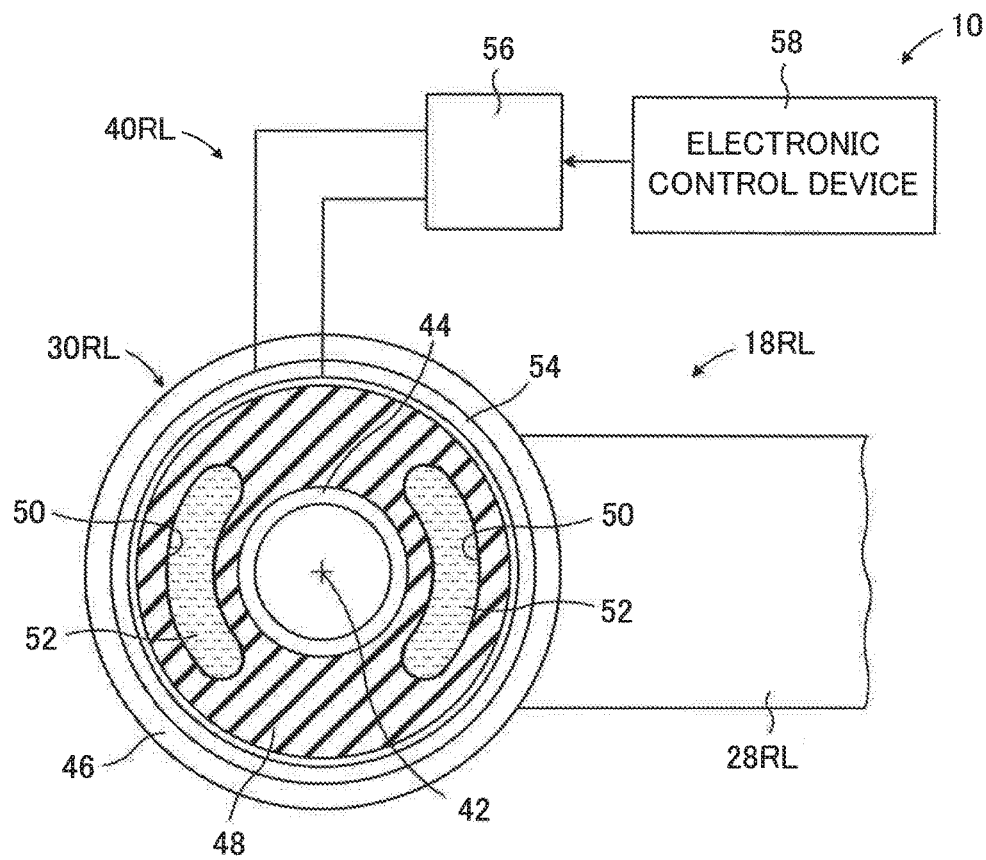
FIG. 8 is an explanatory diagram for illustrating a spring characteristic variable device for a rear left wheel suspension in a suspension device for a vehicle according to a seventh embodiment of the present disclosure.

FIG. 8 is an explanatory diagram for illustrating a spring characteristic variable device 401 for the rear left wheel suspension 18RL in the suspension device 10 for a vehicle according to a seventh embodiment of the present disclosure. A spring characteristic variable device (referred to as spring characteristic variable device 40RR depending on necessity) configured in the same way as the spring characteristic variable device 40RL is also provided for the rear right wheel suspension 18RR, which is not shown.

The spring characteristic variable devices 40RL and 40RR according to the seventh embodiment may be applied to any of the first to sixth embodiments. As in the first to sixth embodiments, the complex spring constant $K_2$ is set to the target complex spring constant $K_{2t}$, which is the complex spring constant $K_2$ when the evaluation indication values E1 to E6 respectively take the minimum values E1 min to E6 min.

The spring characteristic variable device 40RL is applied to the rubber bush device 30RL of the rear left wheel suspension 18RL. The rubber bush device 30RL includes an inner cylinder 44 and an outer cylinder 46 aligned with an axis 42 and concentric with each other, and a rubber bush 48 serving as an elastic body interposed between the inner cylinder and the outer cylinder. The rubber bush 48 is configured to function as an elastic body for allowing mutual displacement between the rear wheel 24RL and the vehicle body 16 at least in the vehicle longitudinal direction. The outer cylinder 46 is integrally coupled at one end to the suspension arm 28RL by means of welding or the like.

A pair of internal spaces 50 commonly called "suguri (voids)" are provided at locations separated substantially in the longitudinal direction with respect to the axis 42 in the rubber bush 48, and a magnetic fluid 52 is filled in the internal spaces 50. A coil 54 having a cylinder shape extending around the rubber bush 48 is provided between the outer cylinder 46 and the rubber bush 48, and the coil 54 is configured to be supplied with a control current from a drive circuit 56, thereby applying magnetic field to the rubber bush 48 depending on necessity. The supply of the control current to the coil 54 by the drive circuit 56 is controlled by an electronic control device 58.

When the magnetic field is applied to the rubber bush 48, the magnetic fluid 52 in the internal spaces 50 is affected by the magnetic field, and magnetic fine particles are aligned with the magnetic field. As a result, the degree of freedom of shape deformation of the internal spaces 50 decreases, the deformation of the rubber bush 48 is thus suppressed, and the spring characteristic variable device 40RL consequently increases an apparent spring constant of the rubber bush 48 of the rubber bush device 30RL. Thus, the compliance in the vehicle longitudinal direction of the rear wheel suspension 18RL decreases, and a degree of the decrease in the compliance is proportional to the strength of the magnetic field applied to the rubber bush 48.

Figure 9:
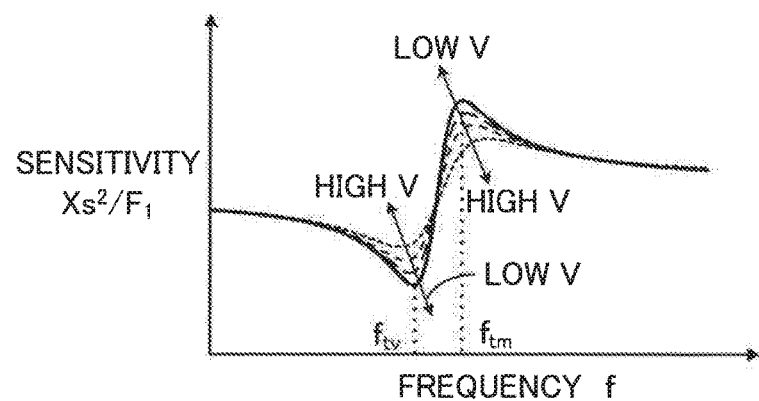
FIG. 9 is a chart for showing that a frequency characteristic of the sensitivity $Xs^2/F_1$ of the vehicle, i.e., a relationship between a frequency f and the sensitivity $Xs^2/F_1$, changes depending on a vehicle speed V.

As shown in FIG. 9, a frequency characteristic of the sensitivity $Xs^2/F_1$ of the vehicle 14, namely, a relationship between the frequency f and the sensitivity $Xs^2/F_1$, changes depending on a vehicle speed V. In particular, the depth of a valley in a vicinity of the frequency $f_{rv}$ and the height of a mountain in a vicinity of the frequency $f_{rm}$ decrease as the vehicle speed increases. A width of the valley increases as the vehicle speed increases. Therefore, the minimum values E1 min to E6 min out of the evaluation indication values E1 to E6 of the respective embodiments increase as the vehicle speed increases, and the effect of decreasing the vehicle body vibration by the optimal setting of the complex spring constant $K_2$ in the longitudinal direction of the rear wheel suspensions 18RL and 18RR thus decreases. From this fact, it is appreciated that the effect of decreasing the vehicle body vibration according to the present disclosure is high in a low vehicle speed region.

Figure 10:
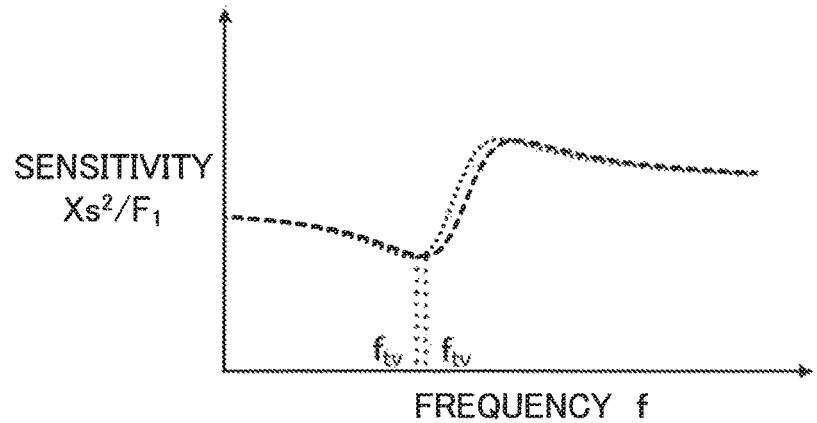
FIG. 10 is a chart for showing a frequency characteristic of the sensitivity $Xs^2/F_1$ of the vehicle when (dotted line) a control current is not supplied to a coil and when (broken line) the control current is supplied to the coil in a case where the vehicle speed V is high.

The dotted line and the broken line of FIG. 10 respectively represent the frequency characteristics of the sensitivity $Xs^2/F_1$ of the vehicle 14 when the control current is not supplied to the coil 52, and when the control current is supplied to the coil 52 in a state where the vehicle speed V is high. As appreciated from a comparison between the dotted line and the broken line, when the compliance in the vehicle longitudinal direction of the rear wheel suspension 18RL is decreased by the supply of the control current, the frequency $f_{rv}$ shifts toward a high frequency side.

Figure 11:
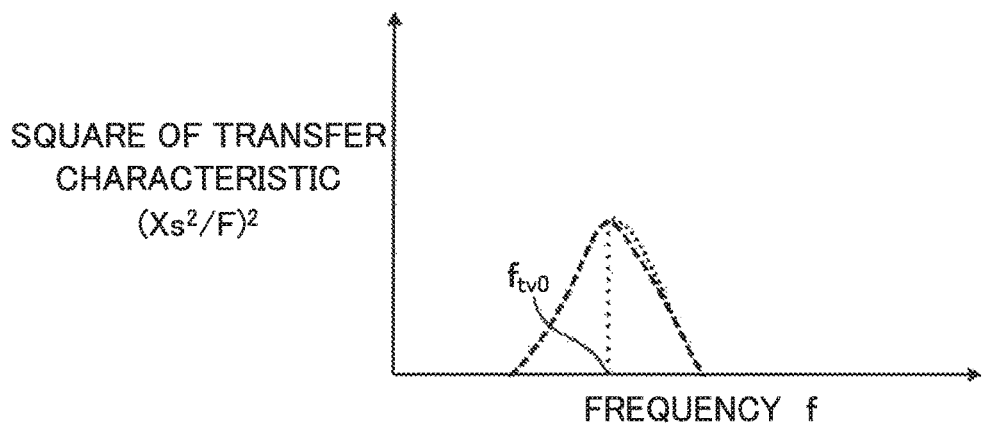
FIG. 11 is a chart for showing the square of the transfer characteristic $Xs^2/F$ of the longitudinal force when (dotted line) the control current is not supplied to the coil and when (broken line) the control current is supplied to the coil in the case where the vehicle speed V is high.

The dotted line and the broken line of FIG. 11 respectively represent the squares of the transfer characteristic $Xs^2/F$, which is the product of the sensitivity $Xs^2/F_1$ and the transmission force characteristic $F_1/F$, when the control current is not supplied to the coil 52, and when the control current is supplied to the coil 52 in a state where the vehicle speed V is high. From the comparison between the dotted line and the broken line of FIG. 11, it is appreciated that the transfer characteristic $Xs^2/F$ can be decreased by supplying the control current to the coil 52 on a higher frequency side with respect to a frequency $f_{rv0}$ when the control current is not supplied to the coil 52.

In general, the passenger of the vehicle is likely to feel, during high speed travel, the longitudinal vibration on the higher frequency side with respect to the frequency $f_{n0}$ when the control current is not supplied to the coil 52. Thus, according to the seventh embodiment, the transmission of the longitudinal force from the front wheel to the vehicle body can be effectively suppressed during high speed travel by increasing the control current supplied to the coil 52 as the vehicle speed V increases, thereby effectively decreasing the degree of the longitudinal vibration of the vehicle body felt by the passenger of the vehicle.

Figure 12:
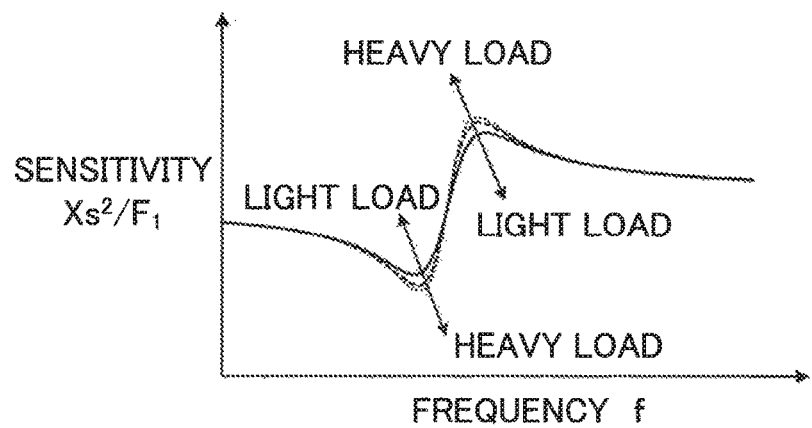
FIG. 12 is a chart for showing that the frequency characteristic of the sensitivity $Xs^2/F_1$ of the vehicle, i.e., the relationship between the frequency f and the sensitivity $Xs^2/F_1$, changes depending on a loaded state of the vehicle.

As shown in FIG. 12, a frequency characteristic of the sensitivity $Xs^2/F_1$ of the vehicle 14, namely, the relationship between the frequency f and the sensitivity $Xs^2/F_1$, also changes depending on a loaded state of the vehicle. Thus, the compliance in the vehicle longitudinal direction of the rear wheel suspensions 18RL and 18RR may be variably set by determining the loaded state of the vehicle and increasing, based on the determination result, the control current supplied to the coil 52 as a load amount of the vehicle decreases.

The specific embodiments of the present disclosure are described in detail above. However, the present disclosure is not limited to the embodiments described above. It is apparent to those skilled in the art that various other embodiments may be employed within the scope of the present disclosure.

For example, according to the respective embodiments, the front wheels 12FL and 12FR are the input wheels, namely, the first wheels, and the rear wheels 12RL and 12RR are the second wheels. However, when the degree of freedom of setting the complex spring constant $K_1$ in the longitudinal direction of the front wheel suspensions 18FL and 18FR is higher than the degree of freedom of setting the complex spring constant $K_2$ in the longitudinal direction of the rear wheel suspensions 18RL and 18RR, such a correction as to consider the rear wheels as the first wheels, and as to consider the front wheels as the second wheels may be made. In this case, instead of the complex spring constant $K_2$ in the longitudinal direction of the rear wheel suspensions 18RL and 18RR, the complex spring constant $K_1$ in the longitudinal direction of the front wheel suspensions 18FL and 18FR is set to the optimum value so that the evaluation indication value takes the minimum value.

Moreover, according to the respective embodiments, the inclination angle $\theta R$ in the vehicle longitudinal direction of the shock absorbers 34RL and 34RR, the spring constant of the rubber bush devices 30RL and 30RR of the rear wheel suspensions 18RL and 18RR, and the like are adjusted in order to set the complex spring constant $K_2$ to the optimal value. However, in addition to the adjustment of the inclination angle $\theta R$, the spring constant of the rubber bush devices, and the like, such a correction may be made that the value of the characteristic $C_2$ between the tire of the rear wheel and the road surface is adjusted, for example, by adjusting the casing rigidity of the tires of the rear wheels.

Moreover, according to the respective embodiments, the evaluation indication value is determined for each of the inclination angles $\theta R$ by setting the spring constant of the rubber bush devices 30RL and 30RR and the like to various values for each of the inclination angles $\theta R$ in the vehicle longitudinal direction of the shock absorbers 34RL and 34RR. Further, the minimum value of the evaluation indication value is identified, and the inclination angle $\theta R$ and the compliance in the vehicle longitudinal direction of the rear wheel suspensions 18RL and 18RR corresponding to the minimum value are set to the optimal values, thereby setting the complex spring constant $K_2$ to the optimal value.

However, the optimal value of the complex spring constant $K_2$ may be acquired based on the minimum value of the evaluation indication value, and the optimal values of the inclination angle $\theta R$ and the compliance of the rear wheel suspensions 18RL and 18RR may be acquired so that the complex spring constant $K_2$ takes the optimal value.

Moreover, according to the respective embodiments, the front left and right wheel suspensions 18FL and 18FR have the suspension characteristics that are the same as each other, and the rear left and right wheel suspensions 18RL and 18RR have the suspension characteristics that are the same as each other. However, the suspension device according to this disclosure may be applied to a vehicle having different suspension characteristics between the left and right suspensions. In this case, the suspensions 18FL and 18RL for the front and rear left wheels and the suspensions 18FR and 18RR for the front and rear right wheels are respectively set as in the respective embodiments.

Moreover, according to the third embodiment, the value of the evaluation indication value E3 is the integral of the square of the first product $(Xs^2/F_1)(F_1/F_F)$ in the predetermined frequency range of from fl to fh. However, the value of the evaluation indication value E3 may be replaced by the integral of the product of the gain G and the square of the first product $(Xs^2/F_1)(F_1/F_F)$.

Similarly, according to the sixth embodiment, the value of the evaluation indication value E6 is the integral of the sum of the square of the first product and the square of the second product in the predetermined frequency range of from fl to fh. However, the value of the evaluation indication value E6 may be replaced by the integral of the sum of the product of the gain G1 and the square of the first product $(X_Fs^2/F_{1F})(F_{1F}/F_F)$ and the product of the gain G2 and the square of the second product $(X_Rs^2/F_{1R})(F_{1R}/F_R)$.

FIG. 8 is an explanatory diagram for illustrating a spring characteristic variable device 40RL for the rear left wheel suspension 18RL in the suspension device 10 for a vehicle according to a seventh embodiment of the present disclosure. A spring characteristic variable device (referred to as spring characteristic variable device 40RR depending on necessity) configured in the same way as the spring characteristic variable device 40RL is also provided for the rear right wheel suspension 18RR, which is not shown.

For example, the spring characteristic variable device may be configured to change the pressure of a fluid, e.g., oil or compressed air, in the voids of the rubber bush, thereby changing the apparent spring constant of the rubber bush. Moreover, as disclosed in Japanese Patent Application Laid-open No. 2009-227200, an actuator may be configured to elastically deform a rubber bush, thereby changing the apparent spring constant of the rubber bush. Further, as described in Japanese Patent Application Laid-open No. 2009-78619, an electro-responsive elastic member may be used as the rubber bush, and electric field may be applied to change the elastic modulus of the rubber bush, thereby changing the apparent spring constant of the rubber bush.

What is claimed is:

1. A suspension device for a vehicle, comprising first and second suspensions for respectively suspending, from a vehicle body, first and second wheels arranged separately from each other in a vehicle longitudinal direction, and an electronic control device, wherein:

the electronic control device is configured to set a first product as a product $((Xs^2/F_1)\cdot(F_1/F))$ of a sensitivity $(Xs^2/F_1)$ (s is Laplacian) represented by a first transmission force $(F_1)$, which is a force received by the vehicle body from the first wheel, and a displacement (X) of the vehicle body in the vehicle longitudinal direction when a first longitudinal force (F) is input to the first wheel and a first transmission force characteristic ($F_1/F$) of the vehicle, which is a ratio of the first transmission force ($F_1$) to the first longitudinal force (F);

the electronic control device is configured to set a target complex spring constant as a complex spring constant in the vehicle longitudinal direction of the second suspension in a case where an evaluation indication value correlating with a square ($\{(Xs^2/F_1)\cdot(F_1/F)\}^2$) of the first product takes a minimum value out of values that are likely to be taken by the evaluation indication value in a predetermined frequency range (fl to fh) set in advance so as to include a peak frequency ($f_s$) corresponding to a peak value of the first transmission force characteristic; and the electronic control device is configured to adjust a magnetic fluid in an internal space of a rubber bush in the suspension device in order to set the complex spring constant in the vehicle longitudinal direction of the second suspension to the target complex spring constant.

2. The suspension device for a vehicle according to claim 1, wherein the evaluation indication value is a maximum value of the square ($\{(Xs^2/F_1)\cdot(F_1/F)\}^2$) of the first product in the predetermined frequency range (fl to fh).

3. The suspension device for a vehicle according to claim 2, wherein the evaluation indication value is a maximum value of a product ($G\{(Xs^2/F_1)\cdot(F_1/F)\}^2$) of a first coefficient (G) set depending on a frequency of the first longitudinal force (F) so as to increase as a passenger of the vehicle is more likely to feel a longitudinal vibration of the vehicle body caused by the first longitudinal force (F) and the square ($\{(Xs^2/F_1)\cdot(F_1/F)\}^2$) of the first product in the predetermined frequency range (fl to fh).

4. The suspension device for a vehicle according to claim 1, wherein the evaluation indication value is a value acquired by integrating the square ($\{(Xs^2/F_1)\cdot(F_1/F)\}^2$) of the first product from a lower limit value (fl) to an upper limit value (fh) in the predetermined frequency range (fl to fh).

5. The suspension device for a vehicle according to claim 1, wherein:

the first and second wheels are respectively a front wheel and a rear wheel;

the electronic control device is configured to set a second product as a product (($X_R s^2/F_{1R})\cdot(F_{1R}/F_R)$) of a second sensitivity ($X_R s^2/F_{1R}$) (s is Laplacian) represented by a second transmission force ($F_{1R}$), which is a force received by the vehicle body from the second wheel, and a displacement ($X_R$) of the vehicle body in the vehicle longitudinal direction when a second longitudinal force ($F_R$) is input to the second wheel and a second transmission force characteristic ($F_{1R}/F_R$) of the vehicle, which is a ratio of the second transmission force ($F_{1R}$) to the second longitudinal force ($F_R$); and the evaluation indication value is a maximum value of a sum of the square ($\{(X_F s^2/F_{1F})\cdot(F_{1F}/F_F)\}^2$) of the first product and a square ($\{(X_R s^2/F_{1R})\cdot(F_{1R}/F_R)\}^2$) of the second product in the predetermined frequency range (fl to fh).

6. The suspension device for a vehicle according to claim 5, wherein:

the electronic control device is configured to set a first coefficient (G1) as a coefficient that is set depending on a frequency of the first longitudinal force ($F_F$) so as to increase as a passenger of the vehicle is more likely to feel a longitudinal vibration of the vehicle body caused by the first longitudinal force ($F_F$);

the electronic control device is configured to set a second coefficient (G2) as a coefficient that is set depending on a frequency of the second longitudinal force ($F_R$) so as to increase as the passenger of the vehicle is more likely to feel a longitudinal vibration of the vehicle body caused by the second longitudinal force ($F_R$); and the evaluation indication value is a maximum value of a sum of a product ($G1\{(X_F s^2/F_{1F})\cdot(F_{1F}/F_F)\}^2$) of the coefficient (G1) and the square ($\{(X_F s^2/F_{1F})\cdot(F_{1F}/F_F)\}^2$) of the first product and a product ($G2\{(X_R s^2/F_{1R})\cdot(F_{1R}/F_R)\}^2$) of the second coefficient (G2) and the square ($\{(X_R s^2/F_{1R})\cdot(F_{1R}/F_R)\}^2$) of the second product.

7. The suspension device for a vehicle according to claim 1, wherein:

the first and second wheels are respectively a front wheel and a rear wheel;

the electronic control device is configured to set a second product as a product (($X_R s^2/F_{1R})\cdot(F_{1R}/F_R)$) of a second sensitivity ($X_R s^2/F_{1R}$) (s is Laplacian) represented by a second transmission force ($F_{1R}$), which is a force received by the vehicle body from the second wheel, and a displacement ($X_R$) of the vehicle body in the vehicle longitudinal direction when a second longitudinal force ($F_R$) is input to the second wheel and a second force transmission characteristic ($F_{1R}/F_R$) of the vehicle, which is a ratio of the second transmission force ($F_{1R}$) to the second longitudinal force ($F_R$); and the evaluation indication value is a value acquired by integrating a sum of the square ($\{(X_F s^2/F_{1F})\cdot(F_{1F}/F_F)\}^2$) of the first product and a square ($\{(X_R s^2/F_{1R})\cdot(F_{1R}/F_R)\}^2$) of the second product from a lower limit value (fl) to an upper limit value (fh) of the predetermined frequency range (fl to fh).

8. The suspension device for a vehicle according to claim 1, wherein:

the second suspension comprises an elastic body for allowing mutual displacement at least in the vehicle longitudinal direction between the second wheel and the vehicle body; and the electronic control device is configured to change an apparent spring constant of the elastic body, thereby variably setting a complex spring constant in the vehicle longitudinal direction of the second suspension and thereby changing a compliance in the vehicle longitudinal direction of the second suspension.

* * * * *